（12）United States Patent
Aoki

(10) Patent No.: US 9,111,132 B2
(45) Date of Patent: Aug. 18, 2015

(54) IMAGE PROCESSING DEVICE, IMAGE PROCESSING METHOD, AND CONTROL PROGRAM

(75) Inventor: Hiromatsu Aoki, Osaka (JP)

(73) Assignee: OMRON Corporation, Kyoto (JP)

( * ) Notice: Subject to any disclaimer, the term of this patent is extended or adjusted under 35 U.S.C. 154(b) by 106 days.

(21) Appl. No.: 13/984,863

(22) PCT Filed: Mar. 22, 2011

(86) PCT No.: PCT/JP2011/056793
§ 371 (c)(1),
(2), (4) Date: Sep. 12, 2013

(87) PCT Pub. No.: WO2012/120697
PCT Pub. Date: Sep. 13, 2012

(65) Prior Publication Data
US 2013/0343647 A1 Dec. 26, 2013

(30) Foreign Application Priority Data
Mar. 10, 2011 (JP) .................................. 2011-053617

(51) Int. Cl.
G06K 9/00 (2006.01)
H04N 1/62 (2006.01)
G06K 9/46 (2006.01)
G06T 7/40 (2006.01)

(52) U.S. Cl.
CPC ........ *G06K 9/00268* (2013.01); *G06K 9/00281* (2013.01); *G06K 9/4652* (2013.01); *G06T 7/408* (2013.01); *H04N 1/62* (2013.01); *G06T 2207/30201* (2013.01); *H04N 1/628* (2013.01)

(58) Field of Classification Search
CPC .......... G06K 9/00268; G06K 9/00281; G06K 9/4652; G06T 7/408; G06T 2207/30201; H04N 1/644; H04N 1/62; H04N 1/628
USPC ...................... 382/118, 165; 358/520; 348/77
See application file for complete search history.

(56) References Cited

U.S. PATENT DOCUMENTS 6,035,867 A * 3/2000 Barrick .......................... 132/320
6,504,546 B1 * 1/2003 Cosatto et al. ................. 345/473
7,646,880 B2 * 1/2010 Kamada et al. ............... 382/100

(Continued)

FOREIGN PATENT DOCUMENTS

| JP | 2005-276182 A | 10/2005 |
| JP | 2008-160474 A | 7/2008 |
| JP | 2009-231879 A | 10/2009 |

OTHER PUBLICATIONS

International Search Report in corresponding International Application No. PCT/JP2011/056793 mailed May 17, 2011 (3 pages).

*Primary Examiner* — Kanjibhai Patel
(74) *Attorney, Agent, or Firm* — Osha Liang LLP

(57) ABSTRACT

An image processing device that identifies a characteristic of a lip from a face image including a mouth of a person has a representative skin color determination unit that determines a representative color of a skin in the face image, a candidate color determination unit that sets a plurality of regions in the face image such that at least one of the regions contains a part of the lip, and determines representative colors of the regions as candidate colors, and a representative lip color determination unit that determines a representative color of the lip from the plurality of candidate colors, in accordance with a difference in hue and saturation between the representative color of the skin and each candidate color.

20 Claims, 24 Drawing Sheets

(56) References Cited

U.S. PATENT DOCUMENTS 7,657,090 B2 * 2/2010 Omatsu et al. ............... 382/173
8,082,926 B2 * 12/2011 Yano et al. .................... 132/200
8,290,277 B2 * 10/2012 Hwang et al. ................. 382/190
2012/0044335 A1 * 2/2012 Goto .............................. 348/77

* cited by examiner

Normalized image

Smoothed image

A plurality of regions

Wa

Wb

Wc

D1

Wd

D2

We

Wf

Wg

D3

Pixel with maximum brightness

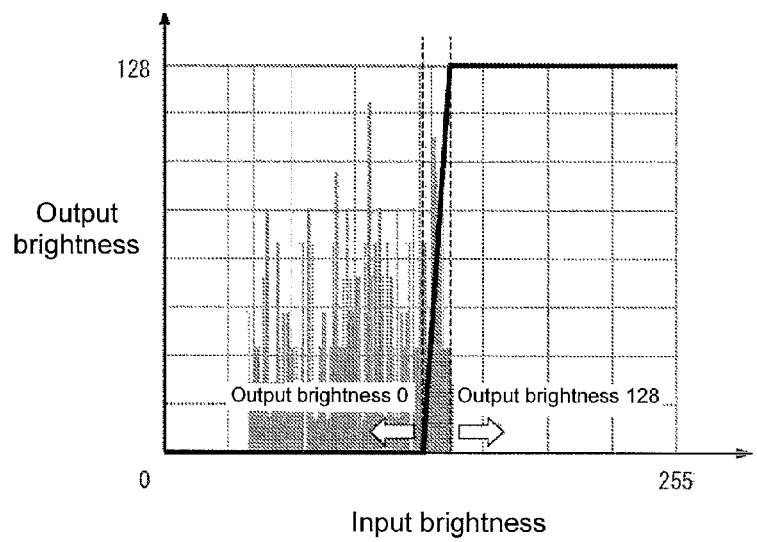
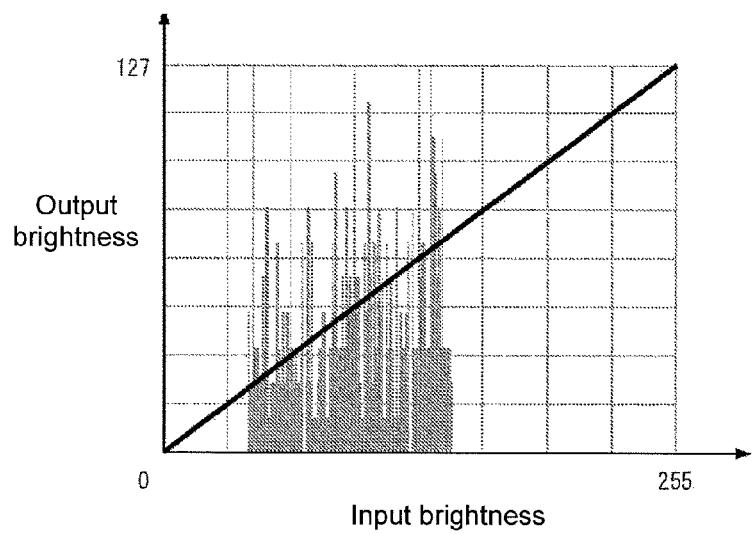

Before correction

Smoothed region (smoothing)

After correction

Increased luster (brightness) region

Cb image

Cr image

Wh

Wi

1−We

1-Wf

IMAGE PROCESSING DEVICE, IMAGE PROCESSING METHOD, AND CONTROL PROGRAM

BACKGROUND

1. Technical Field

The present invention relates to an image processing device and an image processing method, and in particular an image processing device and an image processing method which correct a face image.

2. Related Art

When an image, such as a picture or video, contains the face of a person, in many cases, the face contained in this image could be a part that attracts the attention of a viewer for the image. Conventionally, there has been a technique of correcting or adjusting a face image so as to enhance the appearance of the face contained in the image.

For example, Patent Document 1 discloses a technique of: extracting contours of upper and lower lips; identifying a part surrounded by the inner contours of the detected upper and lower lips as a part corresponding to the teeth; and adjusting the lightness of the part corresponding to the teeth. For example, by lightening pixel values in the part corresponding to the teeth, the appearance of the face can be enhanced. In the technique of Patent Document 1, the contour of the lip is detected from the difference in brightness value among individual pixels within the image, in order to identify the part corresponding to the teeth. In more detail, a plurality of detection lines extending in a vertical direction (a direction along the height of the face) are defined in a mouth region, then the difference in brightness value among the pixels is checked along each detection line, and points at each of which the brightness value is relatively greatly differs are determined as contour points of the lip. Then, from a spatial distribution of the determined contour points, contour points that correspond to the outer and inner contours of each of the upper and lower lips are identified, and a region surrounded by the inner contours of the upper and lower lips is identified as the inner part of the mouth. Finally, it is believed that a region corresponding to the teeth is present in it.

Patent Document 1: Japanese Unexamined Patent Publication No. 2009-231879 (published on Oct. 8, 2009).

SUMMARY

In order to detect the contour of a lip with the technique of Patent Document 1, it may be necessary to prepare a face image having a proper lighting condition. The brightness values of an image are greatly changed depending on a photographing environment, such as lighting. For example, when a face is photographed under a backlighted condition, the face portion in the face image is entirely darkened, because the face portion is not irradiated with light. Therefore, a difference in brightness value is decreased among the pixels, and is also decreased in the contour portion of a lip. In this case, there may be difficulty identifying the contour points (that a risk of causing the erroneous detection is increased). Furthermore, when a photograph is taken in a room or the like under a low irradiation condition, the noise becomes relatively large, which makes it more difficult to identify the contour of a lip.

On the other hand, when a photograph is taken under a lighting condition that a face is irradiated with light, the contour points can be identified easily, because the brightness values greatly differ in the contour portion of the lip. However, the shade may be produced on the face due to its unevenness, depending on how light hits and a greater difference in the brightness value could occur in the border portion of the shade than in the contour of the lip. As a result, it is difficult to distinguish between the border of the shade and the contour of the lip.

Furthermore, when a photograph is taken in a lighting condition that light strongly hits a face, the face may entirely become whitish (the brightness is increased). For this reason, a portion in the vicinity of the contour of the lip may become whitish, and the difference in brightness value may be decreased in the contour portion. This makes it difficult to identify the contour points. Moreover, when light hits a lipstick or lip gloss and the light is reflected thereon (a luster is created thereon), the brightness may be greatly changed at the border of the luster region. This makes it difficult to distinguish between the borders of the contour and the luster, thereby increasing a risk of the erroneous detection.

Typically, the color of the lip of a face in a photograph is greatly changed by the influence of the individual difference, the change in the lighting condition, the coloring material of a lipstick or lip gloss, and the like. Thus, in general, the color of the lip in a face image cannot be known in advance. There are cases where the color of the lip in a face image is similar to that of the skin due to various conditions (photographic environment, makeup, and the like). There are cases where it is difficult to identify the color of the lip surrounded by the skin.

One or more embodiments of the present invention identifies a color of a lip in a face image photographed under various conditions, and to determine a region of the lip by using the identified lip color.

An image processing device according to one or more embodiments of the present invention identifies a characteristic of a lip from a face image including a mouth of a person. According to one or more embodiments of the present invention, the image processing device includes: a representative skin color determination unit that determines a representative color of a skin in the face image; a candidate color determination unit that sets a plurality of regions in the face image such that at least one of the regions contains a part of the lip and that determines representative colors of the regions as candidate colors; and a representative lip color determination unit that determines a representative color of the lip from the plurality of candidate colors in accordance with a difference in hue and saturation between the representative color of the skin and each candidate color.

An image processing method according to one or more embodiments of the present invention identifies a characteristic of a lip from a face image including a mouth of a person. According to one or more embodiments of the present invention, the image processing method includes: a representative skin color determination step of determining a representative color of a skin in the face image; a candidate color determination step of setting a plurality of regions in the face image such that at least one of the regions contains a part of the lip, and determining representative colors of the regions as candidate colors; and a representative lip color determination step of determining a representative color of the lip from the plurality of representative colors in accordance with a difference in hue and saturation between the representative color of the skin and each candidate color.

According to the above configuration, the representative color of the lip is determined from the candidate colors, on the basis of the difference in hue and saturation within the face image including the lip and skin. Consequently, it is possible to precisely determine a representative color of a lip that may have various colors, so as to be distinguished from a color of a skin. Here, the difference in the hue and saturation refers to a difference between two colors in a hue and saturation plane, and implies a difference in hue, a difference in saturation, and a distance in the hue and saturation plane.

According to one or more embodiments of the present invention, as described above, a representative color of a lip is determined from candidate colors, on the basis of a difference in hue and saturation within a face image including a lip and skin.

Consequently, it is possible to precisely determine a representative color of a lip that may have various colors, so as to be distinguished from a color of a skin.

BRIEF DESCRIPTION OF THE DRAWINGS

FIG. 24(a) is a view depicting a first tone curve for each extracted pixel, and FIG. 24(b) is a view depicting a second tone curve for each extracted pixel.

DETAILED DESCRIPTION

Hereinafter, a description will be given of embodiments of an image processing device. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Although below, the image processing device installed in a digital camera and that processes a face image contained in a captured image; however, the present invention is not limited to this. For example, the image processing device according to one or more embodiments of the present invention may be installed in a photographing device, such as a digital video camera, a Web camera for a personal computer (PC), or a cellular phone with a camera, and process an image obtained by taking a photograph with the photographing device. In addition, the image processing device according to one or more embodiments of the present invention may also process an image obtained from a communication path such as a network or an external storage device. Moreover, the image processing device may also process a face image in a captured static image, as well as in a moving image and the like. Furthermore, the image processing device may process a preview image displayed on a display device of the digital camera when a digital camera captures an image.

Hereinafter, embodiments of the present invention will be described in detail, with reference to the drawings.

(Configuration of Digital Camera)

Figure 1:
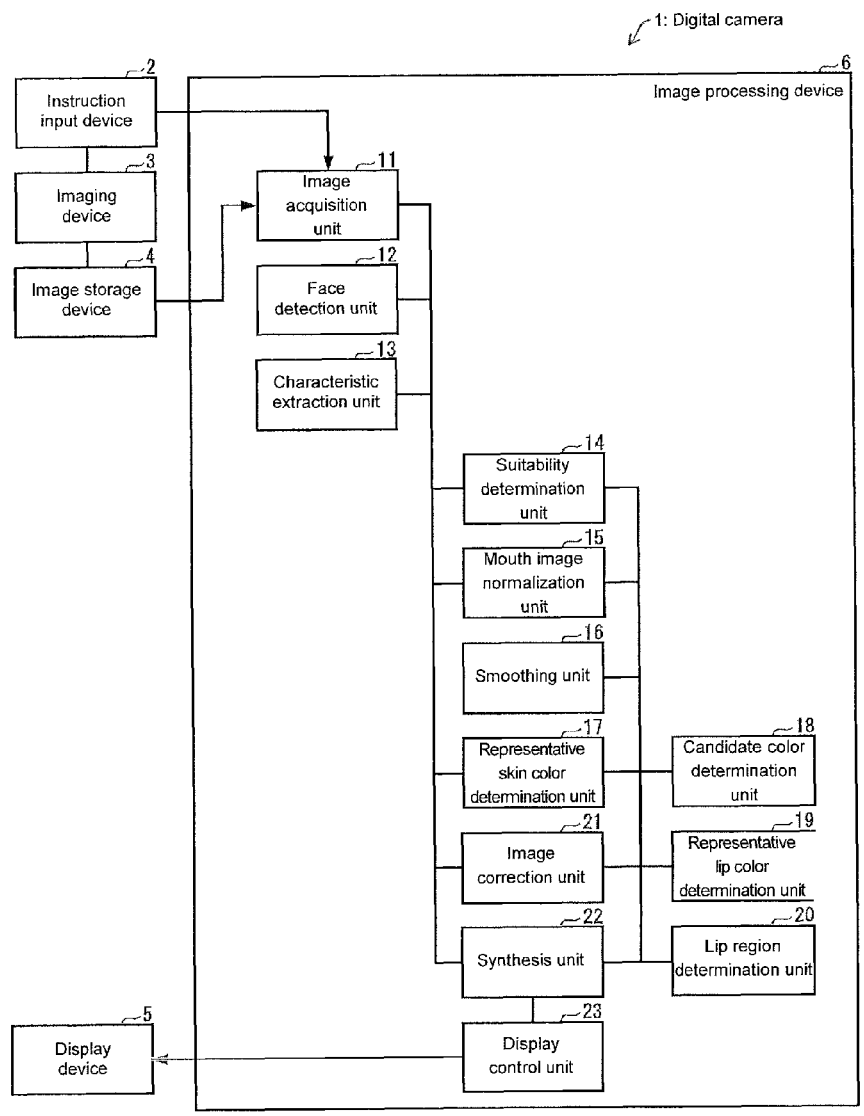
FIG. 1 is a block diagram of a general configuration of a digital camera according to one or more embodiments of the present invention.

FIG. 1 is a block diagram of a general configuration of a digital camera 1 according to one or more embodiments of the present invention. The digital camera 1 includes an instruction input device 2, an imaging device 3, an image storage device 4, a display device 5, and an image processing device 6.

The instruction input device 2 is provided with an input device such as buttons, keys or a touch panel, and receives an instruction of capturing an image from a user, and outputs the instruction of capturing an image to the imaging device 3. In addition, the instruction input device 2 receives an instruction of subjecting a face image to a correction process from a user, and outputs the instruction of the correction process to the image processing device 6.

The imaging device 3 is provided with imaging elements, such as CCDs (charge coupled devices) or CMOS (complementary metal oxide semiconductor) imaging elements. The imaging device 3 captures an image in response to the instruction of capturing an image, and outputs the captured image (image data) to the image storage device 4.

The image storage device 4 stores various pieces of information, and is provided with a storage device, such as a HDD (hard disk drive) or a flash memory. The image storage device 4 stores and retains an image received from the imaging device 3.

The display device 5 is provided with a display, and presents an input image to a user by displaying it. Further, the display device 5 receives a correction-processed image from the image processing device 6, and displays the correction-processed image.

(Configuration of Image Processing Device)

The image processing device 6 includes an image acquisition unit (instruction receiving unit) 11, a face detection unit 12, a characteristic extraction unit 13, a suitability determination unit 14, a mouth image normalization unit 15, a smoothing unit 16, a representative skin color determination unit 17, a candidate color determination unit 18, a representative lip color determination unit 19, a lip region determination unit 20, an image correction unit 21, a synthesis unit 22, and a display control unit 23.

The image acquisition unit 11 receives the instruction of a correction process from the instruction input device 2. The instruction of a correction process includes information indicating an image to be processed and information regarding how to perform a correction process. Examples of the types of a correction process include a lip gloss correction through which an image is corrected so as to coat lip gloss on a lip, and a tooth whitening correction through which an image is corrected so as to whiten teeth. The image acquisition unit 11 obtains an image to be processed, from the image storage device 4 on the basis of the received instruction of a correction process. It should be noted that the image acquisition unit 11 may receive a captured image directly from the imaging device 3. The image acquisition unit 11 outputs the obtained image to be processed, to the face detection unit 12, the characteristic extraction unit 13, the suitability determination unit 14, the mouth image normalization unit 15, the representative skin color determination unit 17, and the synthesis unit 22. In addition, the image acquisition unit 11 outputs the received instruction of a correction process to the image correction unit 21.

The face detection unit 12 detects a face image contained in an image that has been received from the image acquisition unit 11. When the face detection unit 12 detects a face image contained in the image, it determines a location of the face image. The location of the face image may be expressed by coordinates of a predetermined point in the face image or a region of the face image. The face detection unit 12 outputs the location of the face image to the characteristic extraction unit 13, the suitability determination unit 14, the mouth image normalization unit 15, and the representative skin color determination unit 17. It should be noted that the face detection unit 12 may detect a plurality of face images from an image to be processed. When the face detection unit 12 detects the plurality of face images, it may determine a location of each face image, outputting the locations of the plurality of face images to each of the above units.

The characteristic extraction unit 13 detects locations of characteristics of the face in the face image, on the basis of the image to be processed which has been received from the image acquisition unit 11 and the location of the face image which has been received from the face detection unit 12. Specifically, the characteristic extraction unit 13 detects characteristics of organs of the face, such as eyes (the inner or outer corner of each eye, etc.), a mouth (the end points or central point of the mouth, etc.) and a nose (the top of the nose, etc.), and a characteristic of a contour of the face and the like (characteristic points), and determines locations thereof. The locations of the characteristics may be expressed by the coordinates of the characteristic points or regions containing the characteristics. The characteristics can be detected by employing a known technique. The characteristic extraction unit 13 outputs the locations of the detected characteristics of the face to the suitability determination unit 14, the mouth image normalization unit 15, and the representative skin color determination unit 17. It should be noted that the characteristic extraction unit 13 may determine locations of the characteristics of a plurality of face images, outputting the locations of the characteristics of the plurality of face images to each of the above units.

The suitability determination unit 14 determines whether or not the face image is suitable to undergo the correction process, from the image to be processed which has been received from the image acquisition unit 11, the location of the face image which has been received from the face detection unit 12, and the locations of the characteristics of the face which has been received from the characteristic extraction unit 13. For example, the suitability determination unit 14 determines a face image in which a face is oriented sideways, a face is too small, or the like to be unsuitable. A concrete determination method thereof will be described later. It should be noted that when the image to be processed contains a plurality of face images, the suitability determination unit 14 may individually determine whether or not the face images are suitable to undergo the correction process, or identify a predetermined number of faces (for example, a single face) which are suitable to undergo the correction process. The suitability determination unit 14 outputs information indicating the face image that has been determined to be suitable for a process target to the mouth image normalization unit 15, the representative skin color determination unit 17, and the candidate color determination unit 18.

The mouth image normalization unit 15 receives the image to be processed, the location of the face image, and the locations of the characteristics of the face from the image acquisition unit 11, the face detection unit 12, and the characteristic extraction unit 13, respectively. The mouth image normalization unit 15 extracts an image of a mouth region in the face image which is to be processed, with regard to the face image that the suitability determination unit 14 has determined to be suitable for the process target, on the basis of the received information. The mouth image normalization unit 15 normalizes the image size, such that a mouth region of the image to be processed has a predetermined size, in order to facilitate a calculation for a subsequent image process. In more detail, the mouth image normalization unit 15 rotates and scales up or down the face image to be processed as necessary, such that the lateral ends of the mouth are positioned at predetermined coordinates, and cuts the mouth region (region containing the mouth) of the predetermined size out of the mouth image to be processed. FIG. 2(*a*) is an image depicting an image of the normalized mouth region. It should be noted that when the face image to be processed is scaled up or down, a pixel value at a point between original pixels may be interpolated with any given method, as necessary. The mouth image normalization unit 15 outputs the image of the normalized mouth region (mouth image) to the smoothing unit 16 and the image correction unit 21.

The smoothing unit 16 smoothes the mouth image that has been received from the mouth image normalization unit 15. In more detail, the smoothing unit 16 applies a Gaussian filter or the like to the mouth image, generating a smoothed mouth image. FIG. 2(*b*) is an image depicting an image of the smoothed mouth region. Using the smoothed mouth image makes it possible to remove noise and determine a desired region, such as a lip, precisely. It should be noted that the normalized mouth image and the smoothed mouth image are color images; however, FIG. 2 depicts light and shade in accordance with the brightness values (Y values). The smoothing unit 16 outputs the smoothed mouth image to the candidate color determination unit 18, the lip region determination unit 20, and the image correction unit 21.

The representative skin color determination unit 17 receives the image to be processed, the location of the face image, and the locations of the characteristics of the face from the image acquisition unit 11, the face detection unit 12, and the characteristic extraction unit 13, respectively. The representative skin color determination unit 17 determines a representative color of a skin in the face image to be processed, with regard to the face image that the suitability determination unit 14 has determined to be suitable for the process target, on the basis of the received information. A color of a part of the face region, such as an average color of the central portion (the portion in the vicinity of the nose) in the face region, or a color having a median or a mode value in the central portion may be determined as the representative color of the skin. Alternatively, an average color of the overall face region or the like may be determined as the representative color of the skin. Moreover, an average color of a region containing the face may be identified, and pixels in this region in each of which the hue differs from that of the average color (an angle with respect to the average color exceeds a threshold in a CbCr plane) and/or in each of which a difference from the average color increases (a distance to the average color exceeds a threshold in the YCbCr color space) may be removed, and an average color calculated from the remaining pixels may be determined as the representative color. In addition, the representative skin color determination unit 17 determines a distribution degree of the skin color. The representative skin color determination unit 17 outputs the representative color of the skin to the candidate color determination unit 18 and the representative lip color determination unit 19. The representative skin color determination unit 17 outputs the distribution degree of the skin color to the representative lip color determination unit 19.

Figure 3:
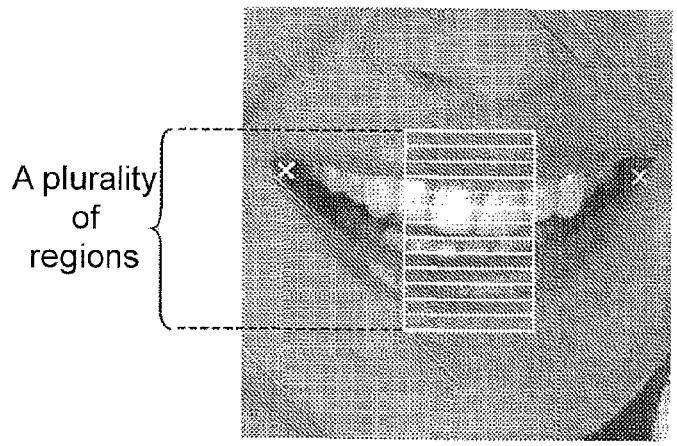
FIG. 3 is a view depicting a plurality of regions in the mouth image.

The candidate color determination unit 18 determines a plurality of candidate colors that become candidates for a color of a lip. The candidate color determination unit 18 sets a plurality of regions in the mouth image, and determines respective representative colors of the regions, setting the representative colors to the candidate colors. FIG. 3 is a view depicting a plurality of regions in the mouth image. In the figure, marks X represent mouth ends detected by the characteristic extraction unit 13. In more detail, the candidate color determination unit 18 performs the following process. The candidate color determination unit 18 separates a predetermined region in the mouth image which is disposed at the center thereof in the lateral direction into a plurality of regions arranged in the longitudinal (vertical) direction. The candidate color determination unit 18 determines respective representative colors (average colors, colors having a median or mode value, or the like) of the separated regions, as a plurality of candidate colors for the lip color. At least one of the regions separated in this manner is assumed to be a region mainly containing a portion that is the lip. Accordingly, at least one of the plurality of candidate colors is considered to be suitable for a representative color of the lip color. However, the method of setting (separating) the regions is not limited to the above. It is only necessary to set a plurality of regions between two mouth ends across which a lip could be present. In addition, there is no limitation on the size of each of the plurality of separated regions, and individual pixels may be treated as a plurality of regions. It should be noted that the candidate color determination unit 18 determines the candidate colors with the smoothed mouth image, in order to determine the candidate colors after removing noise or the like from the image. However, the method of determining the candidate colors is not limited to this. Alternatively, the candidate color determination unit 18 may determine the candidate colors with the non-smoothed mouth image. In addition, the candidate color determination unit 18 determines distribution degrees of the colors of the separated regions, as distribution degrees of the corresponding candidate colors. The candidate color determination unit 18 outputs the plurality of candidate colors to the representative lip color determination unit 19. The candidate color determination unit 18 outputs the distribution degrees of the candidate colors to the representative lip color determination unit 19.

The representative lip color determination unit 19 determines a representative color of the lip from the plurality of candidate colors, on the basis of the representative color of the skin. The representative lip color determination unit 19 determines the candidate color that greatly differs from the candidate color of the skin, as a representative color of the lip, in accordance with a difference in hue and saturation between the candidate color of the skin and each candidate color. The representative lip color determination unit 19 performs the process in a color space in which colors are expressed with brightness (or lightness), hue and saturation, such as the YCbCr or L*a b color space. The representative lip color determination unit 19 determines a degree to which each candidate color is the lip color, on the basis of information regarding the CbCr plane (hue and saturation plane) which expresses hue and saturation in a color space without using information regarding brightness (lightness), thus determining a representative color of the lip in the CbCr plane. A detailed process of determining a representative color of a lip will be described later. The representative lip color determination unit 19 outputs the determined representative color of the lip in the CbCr plane to the lip region determination unit 20 and the image correction unit 21.

Figure 4:
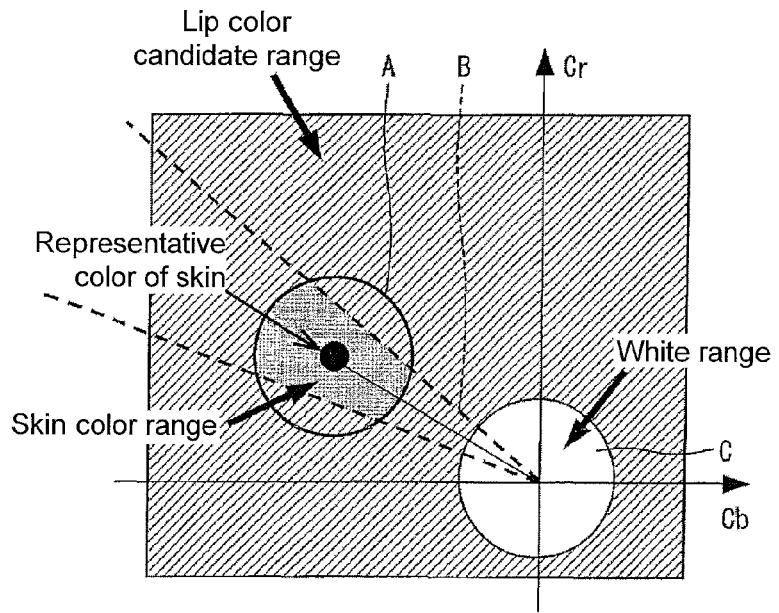
FIG. 4 is a view depicting a range of a color in a CbCr plane which becomes a candidate for a lip color, in a simplified manner.

FIG. 4 is a view depicting a range of a color that becomes a candidate for a lip color in the CbCr plane, in a simplified manner. A color of a lip is assumed to be a color that somewhat differs from a representative color of a skin. For this reason, according to one or more embodiments of the present invention, a color of a range A which has a short distance to a representative color of a skin in the CbCr plane be eliminated from candidates for a lip color. In addition, a color of a skin is assumed to have different hue from that of a representative color of a skin. For this reason, according to one or more embodiments of the present invention, a color of a range B which has hue similar to that of a representative color of a skin in the CbCr plane be eliminated from candidates for a lip color. Furthermore, in the case where an object opens his or her mouth and a mouth image contains the teeth, one or more of a plurality of candidate colors are likely to contain a whitish color expressing the tooth color. In order to eliminate the tooth color from candidates for a lip according to one or more embodiments of the present invention, a color of a range C which has a small amount of saturation be eliminated from candidates for a lip color. Candidates for a lip color can be assumed to be present outside the range A, B and C. It should be noted that in FIG. 4, a range that has a short distance to a representative color of a skin and hue similar to that of the representative color of the skin is treated as a skin color range, a range having a small amount of saturation is treated as a white range, and a range that is neither the skin color range nor white range is treated as a lip color candidate range.

The lip region determination unit 20 determines a region that is the lip in the mouth image, on the basis of the smoothed mouth image and the representative color of the lip. The lip region determination unit 20 determines a region that has a color similar to the representative color of the lip, as a lip region, in accordance with a difference in hue and saturation from the representative color of the lip in the CbCr plane. A detailed process of determining the lip region will be described later. It should be noted that the lip region determination unit 20 determines the lip region with the smoothed mouth image, in order to determine the lip region after removing noise or the like from the image. However, the method of determining the lip region is not limited to this. Alternatively, the lip region determination unit 20 may use the non-smoothed mouth image. The lip region determination unit 20 outputs information indicating the determined lip region, the lip candidate regions, and the like to the image correction unit 21.

The image correction unit 21 corrects a visual quality of the mouth image, on the instruction of the correction process, the normalized mouth image, the smoothed mouth image, and the representative color of the lip, thereby generating a corrected mouth image. A method of correcting the mouth image will be described later. The image correction unit 21 outputs the corrected mouth image to the synthesis unit 22.

The synthesis unit 22 returns a size of the corrected mouth image to an original size thereof before the corrected mouth is normalized (by rotating or scaling up or down the corrected mouth image as necessary), and then combines the corrected mouth image with the image to be processed, thereby generating a corrected image. Consequently, an image in which the visual quality of the mouth and the like in the image to be processed has been corrected is obtained. The synthesis unit 22 outputs the corrected image to the display control unit 23. It should be noted that the synthesis unit 22 may output the corrected image to the image storage device 4, causing the image storage device 4 to store it.

The display control unit 23 outputs the corrected image to the display device 5, and controls the display device 5 to display the corrected image.

(Image Processing Flow)

Hereinafter, a description will be given of a flow of an image correction flow performed by the digital camera 1.

A user selects the image to be processed, from among images, for example, that have been captured and stored in the image storage device 4 through the instruction input device 2. In addition, the user selects the type of a correction process (a lip gloss correction, a tooth whitening correction, or the like) which is to be subjected to the image to be processed, from among a plurality of candidates through the instruction input device 2. The instruction input device 2 outputs an instruction of the correction process, including information regarding the designated type of correction process, to the image acquisition unit 11 in the image processing device 6.

Figure 5:
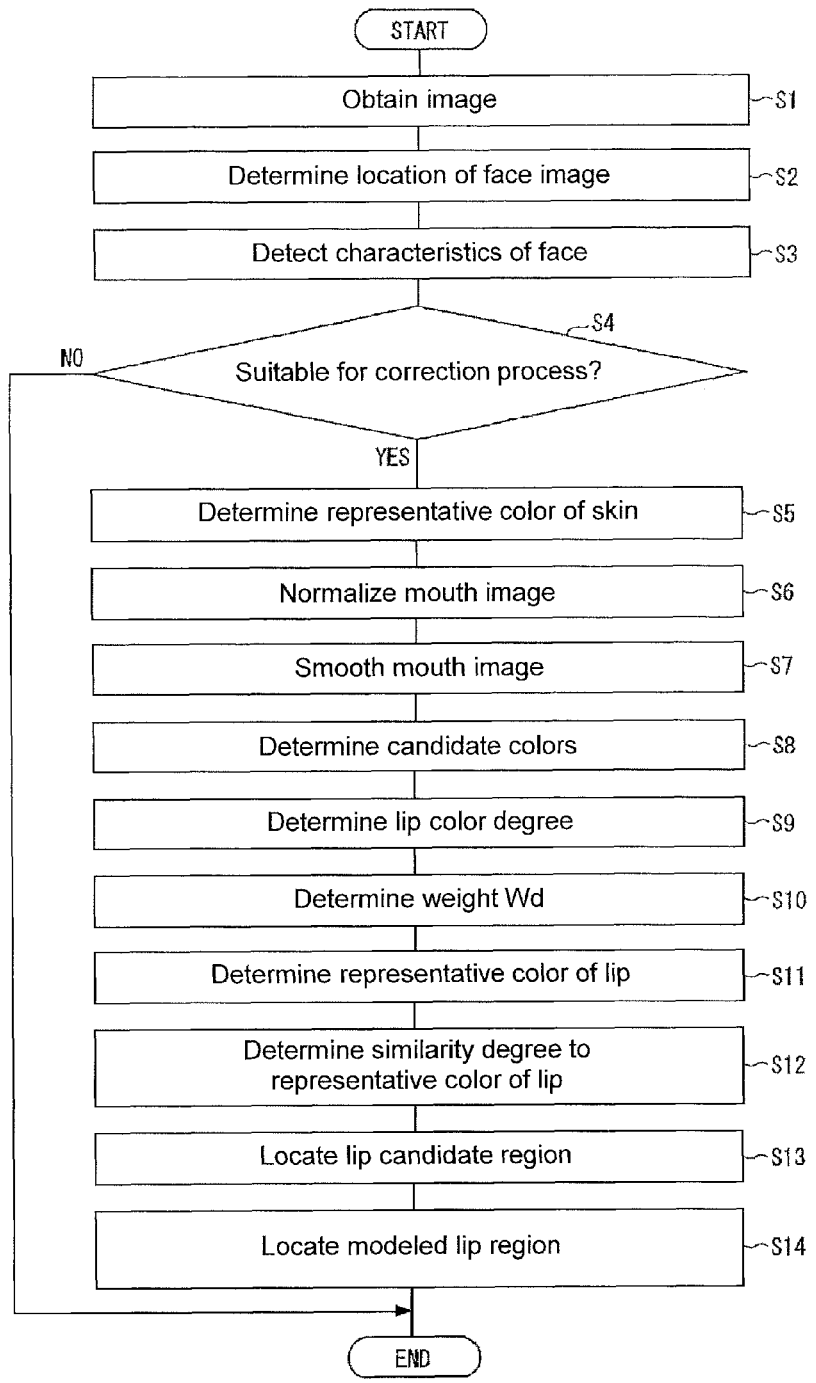
FIG. 5 is a flowchart of a flow of a lip color determination process and lip region location process.

FIG. 5 is a flowchart of a flow of a lip color determination process and lip region location process performed by the image processing device 6.

Once the image acquisition unit 11 receives the instruction of the correction process from the instruction input device 2, it obtains the image to be processed, from the image storage device 4 (S1).

The face detection unit 12 detects a face image contained in the image to be processed, and determines a location of the face image (S2). The face detection unit 12 may detect a plurality of face images contained in the image to be processed.

The characteristic extraction unit 13 detects locations of characteristics of the face contained in the detected face image (S3). The characteristic extraction unit 13 detects characteristics of organs of the face, such as eyes (the inner or outer corner of each eye, etc.), a mouth (the end points or central point of the mouth, etc.) and a nose (the top of the nose, etc.), and determines locations thereof. It should be noted that the characteristic extraction unit 13 may detect a contour of the face or the like.

The suitability determination unit 14 determines whether or not the face image is suitable to undergo the correction process, on the basis of the detected locations of the characteristics of the face (S4). For example, the suitability determination unit 14 stores, in advance, a face model created by learning a property of a brightness distribution around each characteristic of the face organs, such as eyes, nose, and mouth, through a plurality of face image samples. The suitability determination unit 14 evaluates reliability of the detected characteristics of the face image and identifies an orientation of the face, by comparing the face model and the detected face image.

For example, if the reliability of the detected characteristics is lower than a predetermined threshold, the characteristics of the face may not have been detected precisely. Accordingly, there arises a risk that the correction process cannot be subjected to the mouth, lip and the like appropriately. For this reason, when the reliability of the detected characteristics is lower than the predetermined threshold, the suitability determination unit 14 determines that the face image is unsuitable to undergo the correction process.

Furthermore, if the detected orientation of the face is greatly angled with respect to the front (if the orientation of the face does not fall within a predetermined range, for example, if the orientation of the face with respect to the front exceeds a predetermined angle (for example, 30°), there arises a risk that the correction process cannot be performed appropriately. In this case, the suitability determination unit 14 determines that the face image is unsuitable to undergo the correction process.

Moreover, if the face image is too small (for example, a distance between both ends of the detected mouth is shorter than a predetermined threshold (for example, 100 pixels)), there arises a risk that the correction process cannot be performed appropriately. Therefore, the suitability determination unit 14 determines that the face image is unsuitable to undergo the correction process.

If the face image is determined to be unsuitable to undergo the correction process (No at S4), the process for the face image is terminated.

If the face image is determined to be suitable to undergo the correction process (Yes at S4), the representative skin color determination unit 17 then determines a representative color of a skin in the face image to be processed, with regard to the face image determined to be suitable for the process target (S5). Here, an average color of a central portion (portion in the vicinity of the nose) of the face region is treated as a representative color of the skin. In addition, the representative skin color determination unit 17 determines a distribution degree (standard deviation) of the skin color. In more detail, the representative skin color determination unit 17 determines a distribution $\sigma bs^2$ on the Cb axis, a distribution $\sigma rs^2$ on the Cr axis, and a distribution of hue $\sigma ps^2$ in a color space for pixel values of pixels within the region (in the vicinity of the nose) in which the average color is determined.

The mouth image normalization unit 15 extracts an image of the mouth region in the face image to be processed, and generates a mouth image by normalizing a size of the image, such that the mouth region in the image to be processed has a predetermined size (S6). In more detail, the mouth image normalization unit 15 rotates and scales up or down the face image to be processed as necessary such that the lateral ends of the mouth are positioned at predetermined coordinates, and cuts the mouth region of the predetermined size out of the face image to be processed.

The smoothing unit 16 smoothes the normalized mouth image (S7).

The candidate color determination unit 18 separates a predetermined region in the mouth image which is disposed at the center thereof in the lateral direction into a plurality of regions arranged in the longitudinal direction, and determines respective representative colors of the separated regions, as a plurality of candidate colors for the lip color (S8). In this case, an average color of each region is set to the candidate color for each region.

It should be noted that neither of the representative color of the skin and the plurality of candidate colors may contain information regarding brightness. In the following process, a representative color of the lip color is determined and a lip region is determined by using the representative color of the skin and the plurality of candidate colors in the CbCr plane without using the brightness (Y).

The representative lip color determination unit 19 determines a degree to which each candidate color is the lip color (lip color degree) (S9). It is assumed that the lip in the mouth image has a different color from that of the skin and different hue from that of the skin color. In addition, it is assumed that the lip in the mouth image also has a different color from that of the teeth which generally look whitish. As a color has: a longer distance to the representative color of the skin in the CbCr plane; a greater difference in hue from the representative color of the skin; and a larger amount of saturation, a lip color degree of this color increases.

In more detail, the representative lip color determination unit 19 determines a first non-skin-color degree for each candidate color (degree to which each candidate color is not a skin color), which increases according to the distance between each candidate color and the representative color of the skin in the CbCr plane, as a weight for the lip color degree. The representative lip color determination unit 19 determines a second non-skin-color degree for each candidate color (degree to which each candidate color is not a skin color), which increases according to a difference in hue between each candidate color and the representative color of the skin, as a weight for the lip color degree. The representative lip color determination unit 19 determines a non-teeth-color degree for each candidate color (degree to which each candidate color is not a tooth color), which increases according to saturation of each candidate color, as a weight for the lip color degree.

A weight Wa for the lip color degree (first non-skin-color degree) according to the distance in the CbCr plane can be determined by the following equation.

Figure 6A:
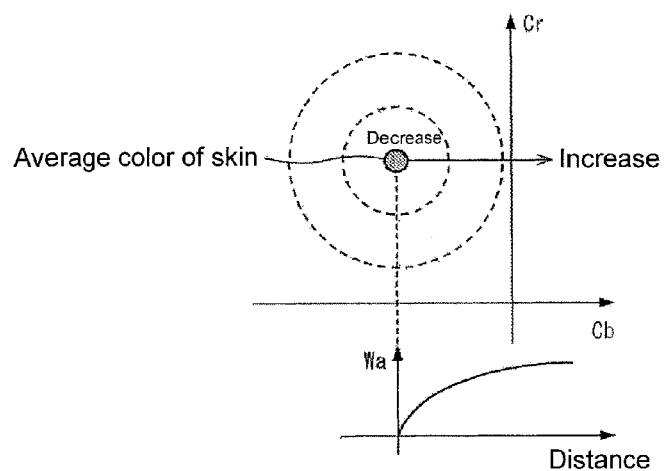
FIG. 6(a) is a view depicting a relationship between a distance between a candidate color and a representative color of a skin in the CbCr plane and a weight Wa, and FIG. 6(b) corresponds to FIG. 2(b) and is an image depicting a result of calculating the weight Wa of each pixel in the mouth image, instead of the candidate color.
Figure 6B:
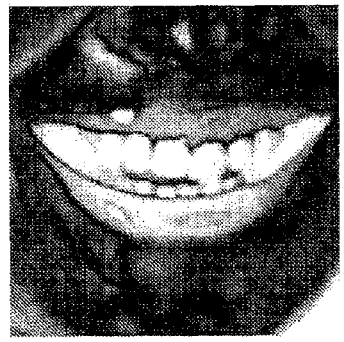

[Equation 1]
$$Wa = 1 - \exp\left\{-\frac{(Cbs - Cb)^2 + (Crs - Cr)^2}{\sigma bs^2 + \sigma rs^2}\right\} \quad (1)$$

where Cbs and Crs denote Cb and Cr components, respectively, in a representative color (average color) of a skin, and Cb and Cr denote Cb and Cr components, respectively, in a candidate color. Furthermore, $\sigma ps$ and $\sigma rs$ denote standard deviations of a skin color on the Cb axis and the Cr axis, respectively, in the color space. FIG. 6(a) is a view depicting a relationship between the weight Wa and the distance between the candidate color and the representative color of the skin in the CbCr plane. According to equation (1), as the distance decreases between the candidate color and the representative color of the skin in the CbCr plane, the weight Wa approaches 0, whereas as the distance increases between the candidate color and the representative color of the skin in the CbCr plane, the weight Wa increases to approach 1. FIG. 6(b) corresponds to FIG. 2(b), and is an image depicting a result of calculating the weight Wa by applying pixel values of pixels in the mouth image to equation (1), instead of the candidate color. It reveals that the weight Wa increases in a light area and decreases in a dark area. It can be found from this that the weight Wa increases in the lip region. However, the weight Wa also increases in the tooth region.

A weight Wb (second non-skin-color degree) for the lip color degree according to the difference in hue can be determined by the following equation.

Figure 7A:
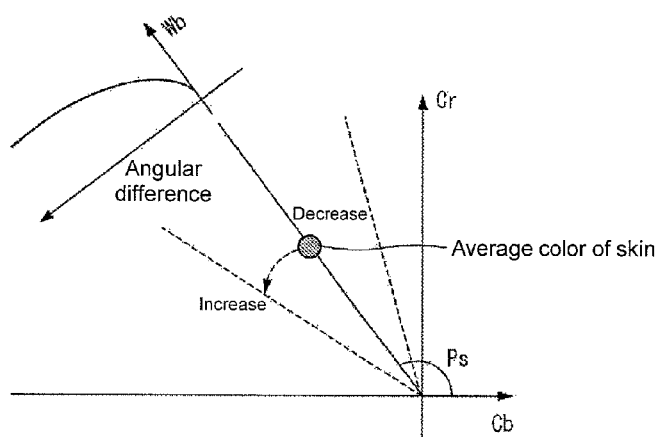
FIG. 7(a) is a view depicting a relationship between hue of a candidate color and a representative color of a skin in the CbCr plane and a weight Wb, and FIG. 6(b) corresponds to FIG. 2(b) and is an image depicting a result of calculating the weight Wb of each pixel in a mouth image, instead of the candidate color.
Figure 7B:
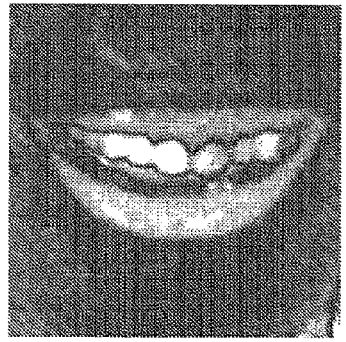

[Equation 2]
$$Wb = 1 + \alpha - \exp\left\{-\frac{(Ps - P)^2}{\sigma ps^2}\right\} \quad (2)$$

where Ps denotes hue of a representative color (average color) of a skin, and is expressed by an angle of a phase in the CbCr plane. P denotes hue of a candidate color. Gps denotes a standard deviation of hue of a skin color. α is a predetermined constant by which the weight We does not become 0, even when hue of a candidate color is the same as that of a representative color of a skin. FIG. 7(a) is a view depicting a relationship between the weight Wb and hue of each of a candidate color and a representative color of a skin in the CbCr plane. According to equation (2), as a difference in hue decreases between the candidate color and the representative color of the skin, the weight Wb approaches a, whereas as the difference in hue increases between the candidate color and the representative color of the skin, the weight Wb increases to approach 1+a. FIG. 7(b) corresponds to FIG. 2(b), and is an image depicting a result of calculating the weight Wb by applying pixel values of pixels in the mouth image to equation (2), instead of the candidate color. It reveals that the weight Wb increases in a light area and decreases in a dark area. It can be found from this that the weight Wb increases in the lip region. However, the weight Wb also increases in a region of a part of the teeth.

A weight Wc (non-teeth-color degree) for the lip color degree according to the saturation can be determined by the following equation.

Figure 8:
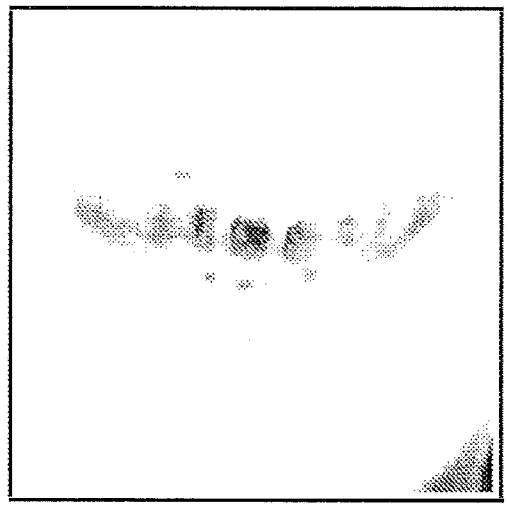
FIG. 8 corresponds to FIG. 2(b), and is an image depicting a result of calculating a weight Wc of each pixel in the mouth image, instead of the candidate color.

[Equation 3]

$$Wc = 1 - \exp\left\{-\frac{Cb^2 + Cr^2}{c}\right\} \qquad (3)$$

where Cb and Cr denote Cb and Cr components, respectively, in a candidate color. c denotes a predetermined constant. In equation 3, the numerator of exp expresses saturation. According to equation (3), as the saturation of a candidate color decreases, the weight Wc approaches 0, whereas as the saturation of the candidate color increases, the weight Wc increases to approach 1. FIG. 8 corresponds to FIG. 2(b), and is an image depicting a result of calculating the weight Wc by applying pixel values of pixels in the mouth image to equation (3), instead of the candidate color. It reveals that the weight Wc increases in a light area and decreases in a dark area. It can be found from this that the weight Wc increases in the lip region. In contrast, it can be found that the weight Wc decreases in a partial region of the teeth which is whitish. The weight We also decreases in an inner part of the mouth which tends to be dark in a photograph.

In the case where the light and dark portions are generated on a skin in a single image due to lighting or the like, even when the skin belongs to the same person, in general, a distance may increase between an average color of the skin and a color at each point of the skin in the color space or the CbCr plane. In other words, the distribution of the skin color may increase in the color space or the CbCr plane. In contrast, the hue is not greatly varied depending on a lighting condition or the like. Therefore, even when the respective weights Wa for a part of a skin and a lip, according to the distance in the CbCr plane, are substantially the same as each other, it is possible to distinguish between the respective colors of the skin and lip by using the weight Wb according to the difference in hue.

Even when respective colors of a lip and skin have the same hue in a single image due to a lipstick or the like, the weights Wb for the skin and lip, according to a difference in hue, may become the same as each other. In such a case, it is possible to distinguish between the respective colors of the skin and lip by using the weights Wa according to the distance in the CbCr plane.

As for the candidate color obtained from a tooth region, its weights Wa according to the distance in the CbCr plane and Wb according to the difference in hue, respectively, may both increase. It is assumed that teeth are generally whitish and their color has a small amount of saturation, whereas the color of the lip has a large amount of saturation. Therefore, it is possible to distinguish between the respective colors of the teeth and lip by using the weight Wc according to the saturation. Furthermore, the saturation also decreases in a dark area in the mouth or the like which is photographed as a shadow. Accordingly, it is possible to distinguish between the respective colors of the dark area and the lip by using the weight Wc according to the saturation.

The representative lip color determination unit 19 determines the product of the first non-skin-color degree Wa, second non-skin-color degree Wb, and non-teeth-color degree Wc for each candidate color, as a lip color degree D1.

[Equation 4]

$$D1 = Wa \times Wx \times Wb \times Wc \qquad (4)$$

Figure 9:
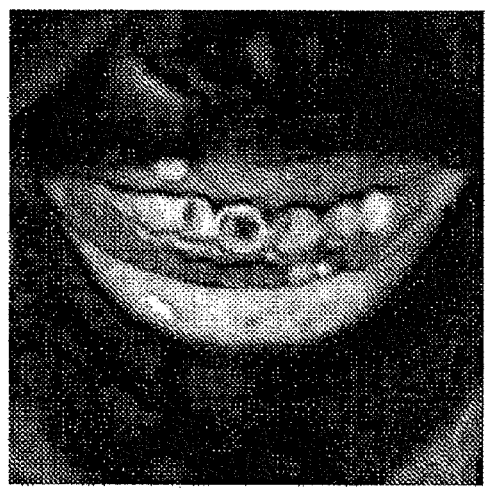
FIG. 9 corresponds to FIG. 2(b), and is an image depicting a result of calculating a lip color degree D1 from a pixel value of each pixel in the mouth image, instead of the candidate color.

FIG. 9 corresponds to FIG. 2(*b*), and is an image depicting a result of calculating the lip color degree D1 from a pixel value of each pixel in a mouth image, instead of a candidate color. It reveals that the lip color degree D1 increases in a light area, and decreases in a dark area. It can be considered that the candidate color exhibiting the high lip color degree D1 is quite likely to be the color of the lip. In the example of FIG. 9, the candidate color obtained from the lip region exhibits the highest lip color degree D1. The representative lip color determination unit 19 selects the candidate color exhibiting the highest lip color degree D1, as a first candidate (first selected candidate color) for the lip color. Meanwhile, if the color of the tooth region does not have the small amount of saturation because the teeth are colored in the image or if the difference decreases between the respective colors of the lip and skin in the CbCr plane, the representative lip color determination unit 19 may select the color of the teeth as the first selected candidate color.

For this reason, according to one or more embodiments of the present invention, the representative lip color determination unit 19 selects a second candidate (second selected candidate color) which has a great difference in hue and saturation from those of the first selected candidate color, from among the remaining candidate colors, and determines either of the first and second selected candidate colors as the color of the lip.

The representative lip color determination unit 19 determines a weight Wd for each candidate color other than the first selected candidate color (degree to which each candidate color is not the first selected candidate color) which increases according to the distance between each candidate color and the first selected candidate color in the CbCr plane (S10). The weight Wd according to the distance to the first selected candidate color can be determined by the following equation.

Figure 10:
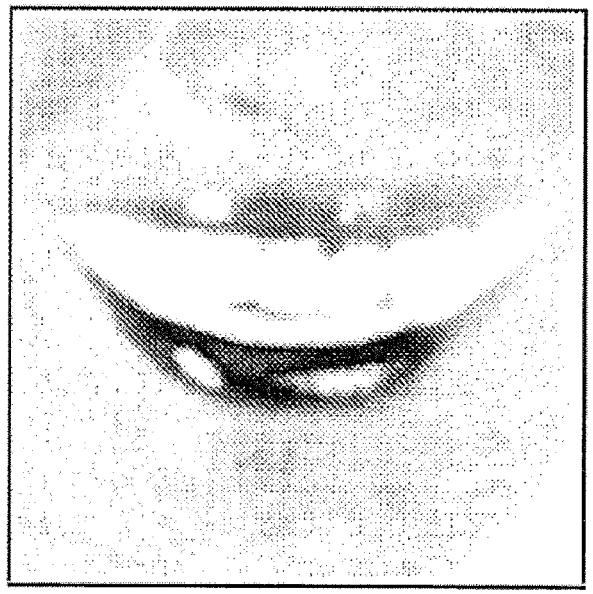
FIG. 10 corresponds to FIG. 2(b), and is an image depicting a result of calculating a weight Wd of each pixel in the mouth image, instead of the candidate color.

[Equation 5]

$$Wd = 1 - \exp\left\{-\frac{(Cbd - Cb)^2 + (Crd - Cr)^2}{\sigma bd^2 + \sigma rd^2}\right\} \qquad (5)$$

where Cbd and Crd denote Cb and Cr components, respectively, in the first selected candidate color, and Cb and Cr denote Cb and Cr components, respectively, in each candidate color. σbd denotes a standard deviation of the first selected candidate color on the Cb axis (standard deviation of the Cb component of each pixel in a region of the first selected candidate color) in the color space. σrd denotes a standard deviation of the first selected candidate color on the Cr axis (standard deviation of the Cr component of each pixel in the region of the first selected candidate color) in the color space. The standard deviation of the first selected candidate color can be determined from a pixel value of each pixel in the regions corresponding to the selected candidate colors (the regions separated by the candidate color determination unit 18). According to equation (5), as a distance decreases between the first selected candidate color and another candidate color in the CbCr plane, the weight Wd approaches 0, whereas as the distance increases between the first selected candidate color and the other candidate color in the CbCr plane, the weight Wd increases to approach 1. FIG. 10 corresponds to FIG. 2(b), and is an image depicting a result of calculating the weight Wd by applying pixel values of pixels in a mouth image to equation (5), instead of a candidate color. It reveals that the weight Wd increases in a light area and decreases in a dark area. In the example of FIG. 10, however, the candidate color obtained from the lip region is selected as the first selected candidate color. For this reason, the weight Wd of each pixel in the lip region decreases.

The representative lip color determination unit 19 determines a product of the lip color degree D1 and the weight Wd for each candidate color, as a candidate evaluation value D2.

[Equation 6]

$$D2 = D1 \times Wd \quad (6)$$

Figure 2A:
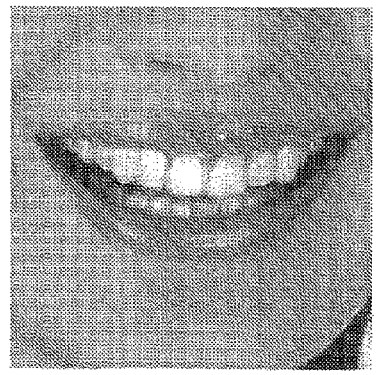
FIG. 2(a) is an image depicting a normalized image of a mouth region.
Figure 2B:
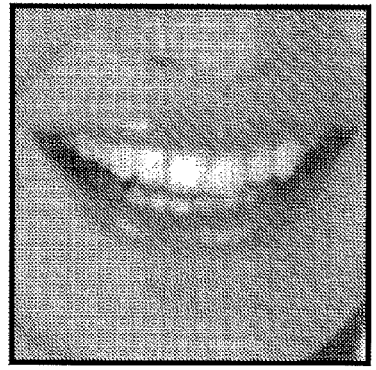
FIG. 2(b) is an image depicting a smoothed image of the mouth region.
Figure 11:
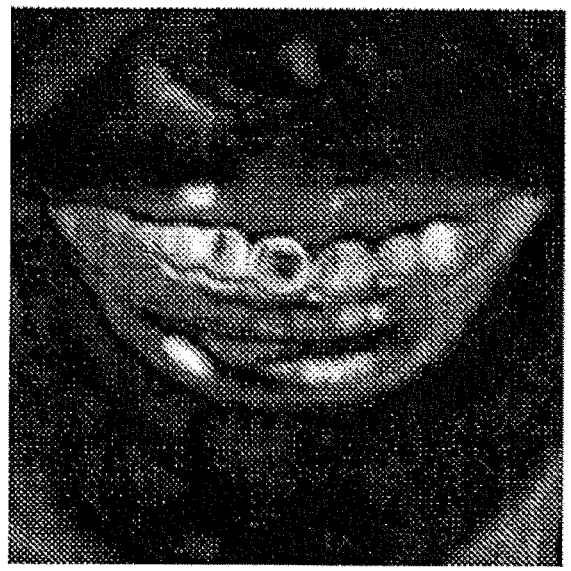
FIG. 11 corresponds to FIG. 2(b), and is an image depicting a result of calculating a candidate evaluation value D2 from a pixel value of each pixel in the mouth image, instead of the candidate color.

FIG. 11 corresponds to FIG. 2(b), and is an image depicting a result of calculating the candidate evaluation value D2 from a pixel value of each pixel in a mouth image, instead of a candidate color. It reveals that the candidate evaluation value D2 increases in a light area, and decreases in a dark area. The representative lip color determination unit 19 selects the candidate color exhibiting the highest candidate evaluation value D2, as a second candidate (second selected candidate color) for the lip color. As a result, if the color of the teeth is selected as the first selected candidate color, the candidate color obtained from the lip region is considered to be selected as the second selected candidate color. Because of the weight Wd, the first and second selected candidate colors are quite likely to be the respective candidate colors obtained from different regions (different parts of the face). By selecting two candidate colors, which are different colors, from among the plurality of candidate colors as the selected candidate colors, the candidate color suitable for the color of the lip is included in either of the selected candidate colors.

The representative lip color determination unit 19 determines a selected candidate color that is more suitable for the color of the lip, from the first and second selected candidate colors, as a representative color of the lip (S11). In the process up to S10, the candidate colors obtained from the lip and tooth regions are quite likely to have been selected as the first and second selected candidate colors, respectively. Therefore, the representative lip color determination unit 19 determines one of the first and second selected candidate colors which exhibits the larger amount of saturation, as the representative color of the lip. It should be noted that the representative lip color determination unit 19 may determine brightness Y of the representative color of the lip, or may not determine the brightness Y. It is at least only necessary to determine the hue and saturation (or the Cb and Cr components) of the representative color of the lip.

Alternatively, the representative color of the lip may be determined in the following manner. The representative lip color determination unit 19 may select the single first selected candidate color in accordance with the lip color degree D1, and determine it as the color of the lip. Moreover, the representative lip color determination unit 19 may select the plurality of first selected candidate colors in accordance with the lip color degree D1, and determine one of them which exhibits a large amount of saturation, as the representative color of the lip. The representative lip color determination unit 19 may select the first and second selected candidate colors in accordance with the lip color degree D1 and the candidate evaluation value D2, respectively, and determine one of the first and second selected candidate colors which exhibits the largest amount of saturation, as the representative color of the lip. Furthermore, the representative lip color determination unit 19 may determine one of the first and second selected candidate colors whose hue is the closest to predetermined hue, as the representative color of the lip. For example, the predetermined hue may be set to hue close to red that is a typical color of a lip, because a condition that a lip is red is satisfied in many cases.

The lip region determination unit 20 determines a similarity degree of each pixel in the mouth image to the representative color of the lip (S12). A region having a color similar to the representative color of the lip is assumed to be a region of the lip. The lip region determination unit 20 determines regions similar to the representative color of the lip, in accordance with a difference in hue and saturation between the color of each pixel and the representative color of the lip. In more detail, the lip region determination unit 20 determines a first lip color similarity degree We and second lip color similarity degree Wf for each pixel. The first lip color similarity degree is according to a distance between the color of each pixel and the representative color of the lip in the CbCr plane, and the second lip color similarity degree Wf is according to a difference in hue between the color of each pixel and the representative color of the lip.

The first lip color similarity degree We according to the distance in the CbCr plane can be determined by the following equation.

Figure 12A:
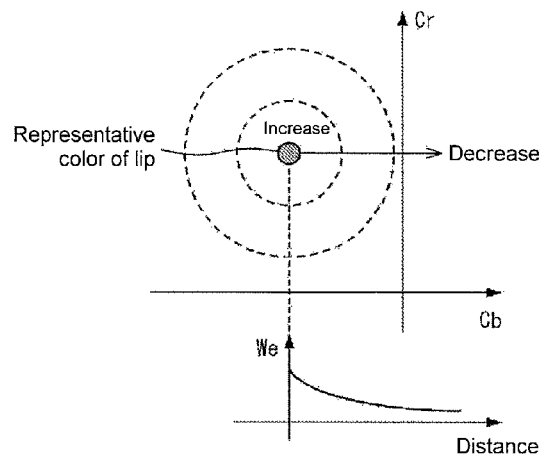
FIG. 12(a) is a view depicting a relationship between a distance from a color of each pixel to a representative color of a lip in the CbCr plane and a first lip color similarity degree We, and FIG. 12(b) corresponds to FIG. 2(b) and is an image depicting a result of calculating the first lip color similarity degree We of each pixel in the mouth image.
Figure 12B:
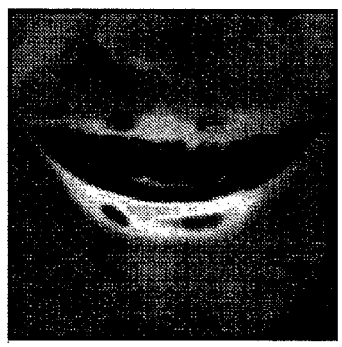

[Equation 7]

$$We = \exp\left\{ -\frac{(Cbl - Cb)^2 + (Crl - Cr)^2}{\sigma bl^2 + \sigma rl^2} \right\} \quad (7)$$

where Cbl and Crl denote Cb and Cr components, respectively, in a representative color of a lip, and Cb and Cr denote Cb and Cr components, respectively, in a color of each pixel. Furthermore, σbl and σrl denote standard deviations of a lip color on Cb axis and the Cr axis, respectively, in a color space. The standard deviation of the lip color can be determined from each pixel in a region (one of the regions separated by the candidate color determination unit 18) corresponding to the representative color of the lip (a candidate color finally determined as the representative color of the lip). FIG. 12(a) is a view depicting a relationship between the first lip color similarity degree We and the distance from the color of each pixel to the representative color of the lip in the CbCr plane. According to equation (7), as the distance decreases between the color of each pixel and the representative color of the lip in the CbCr plane, the first lip color similarity degree We approaches 1. Meanwhile, as the distance increases between the color of each pixel and the representative color of the lip in the CbCr plane, the first lip color similarity degree We decreases to approach 0. FIG. 12(b) corresponds to FIG. 2(b), and is an image depicting a result of calculating the first lip color similarity degree We by applying a color of each pixel in a mouth image to equation (7). It reveals that the first lip color similarity degree We increases in the light areas and decreases in the dark areas. It can be found from this that the first lip color similarity degree We increases in the lip region. However, the first lip color similarity degree We decreases in parts of the lip region, because these parts look shining with lighting or the like and their saturation decreases. Furthermore, if the shade or the like is present on the lip, the first lip color similarity degree We may also decrease.

The second lip color similarity degree Wf according to the difference in hue can be determined by the following equation.

Figure 13A:
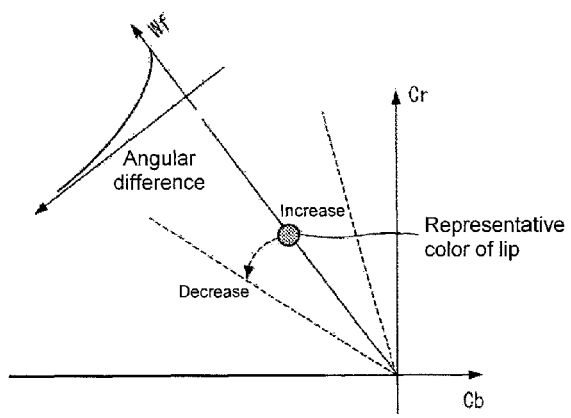
FIG. 13(a) is a view depicting a relationship among hue of a color of each pixel, hue of a representative color of a lip in a CbCr plane, and a second lip color similarity degree Wf, and FIG. 13(b) corresponds to FIG. 2(b) and is an image depicting a result of calculating the second lip color similarity degree Wf of each pixel in the mouth image.
Figure 13B:

[Equation 8] (8)
$$Wf = \exp\left\{-\frac{(Pl-P)^2}{\sigma pl^2}\right\}$$

where Pl denotes hue of a representative color of a lip, and is expressed by an angle of a phase in the CbCr plane. P denotes hue of a color of each pixel. σpl denotes a standard deviation of hue of a lip color. FIG. 13(a) is a view depicting a relationship between the second lip color similarity degree Wf and hue of each of a color of each pixel and the representative color of the lip in the CbCr plane. According to equation (8), as the difference in hue decreases between the color of each pixel and the representative color of the lip, the second lip color similarity degree Wf approaches 1. Meanwhile, as the difference in hue increases between the color of each pixel and the representative color of the lip, the second lip color similarity degree Wf decreases to approach 0. FIG. 13(b) corresponds to FIG. 2(b), and is an image depicting a result of calculating the second lip color similarity degree Wf by applying a color of each pixel in a mouth image to equation (8). It reveals that the second lip color similarity degree Wf increases in light areas and decreases in dark areas. It can be found from this that the second lip color similarity degree Wf increases in the lip region.

The second lip color similarity degree Wf according to the difference in hue is more resistant to lighting and the like than the first lip color similarity degree We, and can provide a stable, precise result. On the other hand, a lipstick or lip gloss is coated on a lip, the lip may have various colors. In the case where a lipstick having the same hue as that of a skin color is coated on a lip, it is difficult to determine a lip region precisely with the second lip color similarity degree Wf according to the difference in hue. Accordingly, when the hue of a lip color is similar to that of a skin color, the first lip color similarity degree We may become a better index for determining a lip region.

Figure 14:
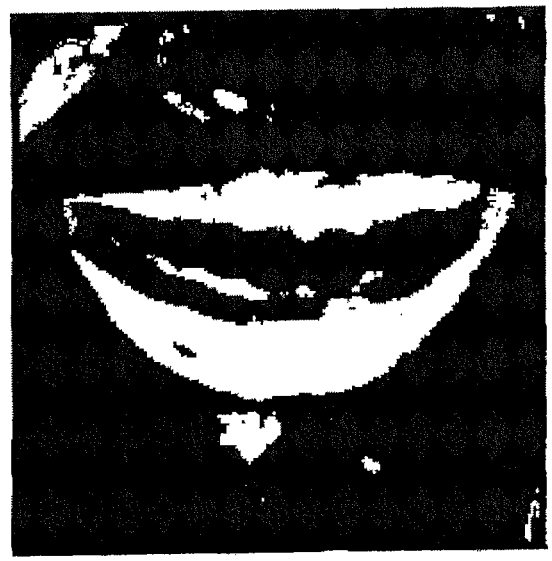
FIG. 14 corresponds to FIG. 2(b), and is an image depicting pixels classified into individual lip candidate regions.

The lip region determination unit 20 determines regions (lip candidate regions or first lip regions), any of which would be a candidate for a lip, from the mouth image, on the basis of the first lip color similarity degree We and the second lip color similarity degree Wf (S13). It is said that each lip candidate region is a region having a color similar to the representative color of the lip. According to one or more embodiments of the present invention, the lip region determination unit 20 determines a pixel, either of the first lip color similarity degree We and the second lip color similarity degree Wf of which has a high value, as the lip candidate region. In more detail, the lip region determination unit 20 compares the first lip color similarity degree We of each pixel with a predetermined threshold, and classifies pixels, the first lip color similarity degree We of which is higher than the threshold, into the lip candidate region. In addition, the lip region determination unit 20 compares the second lip color similarity degree Wf of each pixel with another predetermined threshold, and classifies pixels, the second lip color similarity degree Wf of which is higher than the threshold, into the lip candidate region. FIG. 14 corresponds to FIG. 2(b), and is an image depicting pixels classified into the lip candidate region. Each light area represents the lip candidate region. The image of FIG. 14 corresponds to one produced by binarizing each pixel in the images of FIGS. 12(b) and 13(b) on the basis of the corresponding thresholds and adding them.

It should be noted that the lip region determination unit 20 may determine the lip candidate regions by using either of the first lip color similarity degree W and the second lip color similarity degree Wf. Alternatively, the lip region determination unit 20 may determine a pixel, the first lip color similarity degree We and the second lip color similarity degree Wf of which are higher than the threshold and the other threshold, respectively, as the lip candidate region. In this case, an image depicting the lip candidate region corresponds to one produced by binarizing the images of FIGS. 12(b) and 13(b) and calculating a product of them. Furthermore, the lip region determination unit 20 may calculate an addition or product of the first lip color similarity degree We and the second lip color similarity degree Wf of each pixel before the binarization, and determine the lip candidate region in accordance with this result. Moreover, the lip region determination unit 20 may determine a pixel in which 1−(1−We)×(1−Wf) exceeds a predetermined threshold, as the lip candidate region. The lip region determination unit 20 may exclude an area that can be accurately determined not to be a lip, from the lip candidate region, on the basis of the distribution of the lip candidate region.

The lip region determination unit 20 determines a modeled lip region (second lip region) from the lip candidate regions in the mouth image (S14). There are various methods of determining the modeled lip region. A border of the lip candidate region in the mouth image may be approximated with a modeled function (high-dimensional function, etc.). Alternatively, the modeled lip candidate region may be determined by fitting a lip-shaped model prepared in advance to a spatial distribution of the lip candidate regions. Moreover, the lip region may be determined by means of a segmentation technique on the basis of a lip-shaped model prepared in advance. The lip-shaped model specifies a lip-like lip shape with a function, range, or the like, and may be defined by predetermined procedures indicating a range of the lip.

Figure 15A:
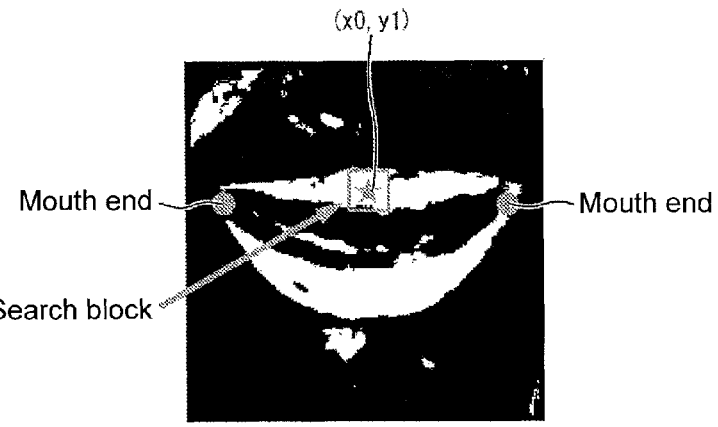
FIGS. 15(a) and (b) correspond to FIG. 14, and are images depicting procedures of determining a modeled lip region from an image depicting a lip candidate region.

A description will be given of a concrete process of determining the modeled lip region which is performed according to one or more embodiments of the present invention. FIGS. 15(a) and (b) correspond to FIG. 14, and are images depicting procedures of determining the modeled lip region from an image depicting the lip candidate regions. The x axis and y axis are defined in the lateral and longitudinal (vertical) directions, respectively. First, a modeled lip region for the upper lip is determined. A central x coordinate (x0) of the mouth in the lateral direction is determined from the locations of the lateral mouth ends which have already been known. In addition, a longitudinal central location (y coordinate y0) of the upper lip is estimated from the locations of the upper and lower ends of the lip candidate region for the upper lip, which are sequentially and longitudinally distributed along the center in the lateral direction (x coordinate=x0).

A rectangle of a predetermined size which is centered on coordinates (x0, y0) is set as a search block (see FIG. 15(a)). According to one or more embodiments of the present invention, the search block be vertically large enough to contain the upper and lower ends of the candidate region for the upper lip. As for the search block at an initial location, a location of a barycenter of pixels in the lip candidate region contained in the search block is determined, and a y coordinate of the barycenter location is set to a longitudinal central location (y coordinate=y1) of the lip region of the upper lip at x coordinate=x0.

Figure 15B:
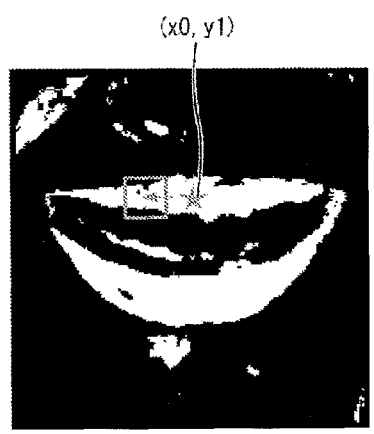

Next, the search block is displaced by Δx toward the mouth end, and the search block which is centered on coordinates (x1, y1) is set (see FIG. 15(b)). Here, a relationship x1=x0+Δx is satisfied. A location of a barycenter of pixels in the lip candidate region contained in the displaced search block is determined, and a y coordinate of the barycenter location is set to a longitudinal central location (y coordinate=y2) of the lip region of the upper lip at x coordinate=x1.

The search block is successively displaced toward a location in the vicinity of the mouth end, and the barycenters thereof are calculated, in the above manner. As a result, coordinates ((x0, y1), (x1, y2), . . . ) of a plurality of points that indicate the longitudinal central locations of the lip region of the upper lip are obtained. This processing may be continued until the search block reaches a predetermined location (for example, the mouth end) or a location at which the lip candidate region is discontinued. For example, it is possible to obtain a curve representing longitudinal central locations of the lip region of the upper lip by determining a curve (a curve of the second or higher order) that connects the plurality of points indicating the longitudinal central locations of the lip region of the upper lip. It should be noted that a plurality of points indicating longitudinal central locations of the lip region of the lower lip can also be obtained in a similar manner.

Figure 16:
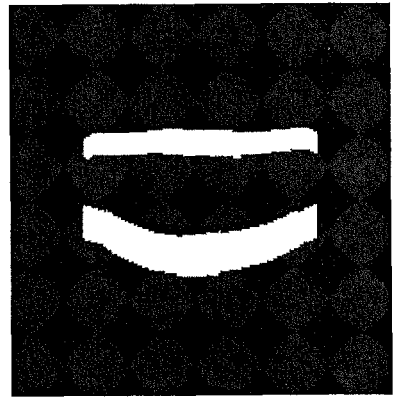
FIG. 16 corresponds to FIG. 15(a), and is an image depicting the modeled lip region.

The lip region determination unit 20 determines a range of a predetermined longitudinal width which is centered on points indicating the longitudinal central locations of the lip region, as a modeled lip region. According to one or more embodiments of the present invention, the range of a predetermined longitudinal width which is centered on the points indicating the longitudinal central locations of the lip region is the lip-shaped model representing a lip-like shape. FIG. 16 corresponds to FIG. 15(a), and is an image depicting the modeled lip region. The light areas indicate the lip region. The lip-shaped region modeled from the lip candidate regions is determined as a lip region, whereby a lip-like lip region from which noise and the like are eliminated can be determined. It should be noted that in the example of FIG. 16, respective areas in the vicinity of the mouth ends are excluded from the lip region intentionally, so that the correction process is not subjected to portions in the vicinity of the mouth ends in the subsequent correction process for the lip.

It should be noted that a distance between the upper and lower ends of the lip candidate region which are sequentially and longitudinally distributed along the center in the lateral direction may be set to the longitudinal width of the modeled lip region. Furthermore, the lip region determination unit 20 may determine a curve by connecting points indicating the longitudinal central locations of the lip region, and determine a region defined by a predetermined longitudinal width of the curve, as the modeled lip region. The lip region determination unit 20 may determine the lip region, on the basis of the points indicating the longitudinal central locations of the lip region, in such a way that the longitudinal width of the lip region is decreased toward each mouth end. In this case, the determined lip region could have a naturally modeled lip shape.

In this way, the lip region determination unit 20 determines the lip region. The lip region determination unit 20 may determine pixel in the lip candidate region, as the lip region. Alternatively, the lip region determination unit 20 may determine only a region that is the lip candidate region and the modeled lip region (region determined from a product of the regions of the images of FIGS. 14 and 16), as the lip region. Up to this point, the lip color determination process and the lip region location process are completed.

Next, the determined lip region is subjected to the lip gloss correction. In order to make the lip seem to be coated with lip gloss, the luster of the lip is increased. Therefore, brightness of a partial region of the lip is increased, and a variation in a color of the lip region is entirely smoothed. In more detail, a lustrous image is prepared in order to add the brightness to some of the pixels in the lip region, and the lustrous image is superposed on (combined with) the mouth image in which the lip region has been smoothed. As a result, the lip region is smoothed, and the brightness of the partial region of the lip is increased.

Figure 17:
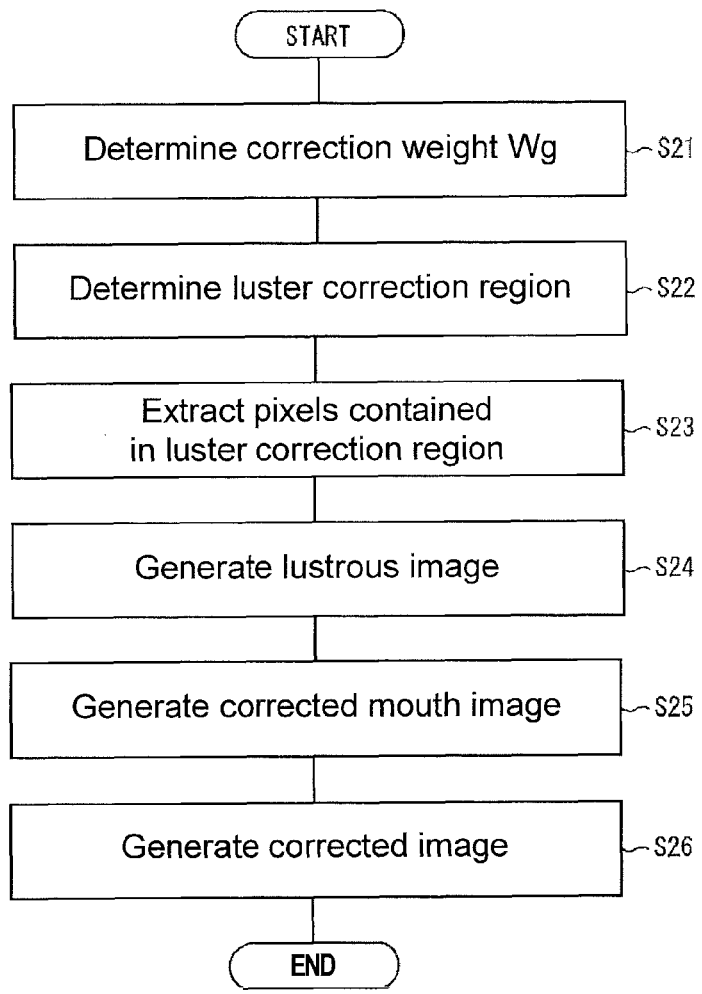
FIG. 17 is a flowchart of a flow of a correction process.

FIG. 17 is a flowchart of a flow of the correction process performed by the image processing device 6.

The image correction unit 21 determines a weight (correction weight Wg) for subjecting pixel locations in the lip region of FIG. 16 to an image correction for a lip (S21). For example, the image correction unit 21 performs the image correction for a natural visual quality by strongly subjecting a portion of the lip region in the vicinity of the center thereof to a luster-increase correction and by weakly subjecting a portion of the lip region in the vicinity of the circumference thereof to the luster-increase correction.

Figure 18:
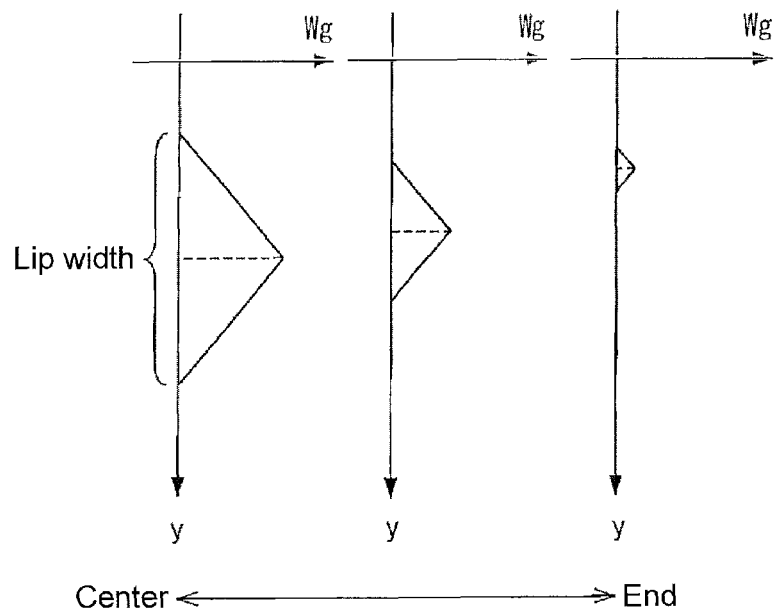
FIG. 18 is a view depicting a correction weight Wg at each lateral location.
Figure 19:
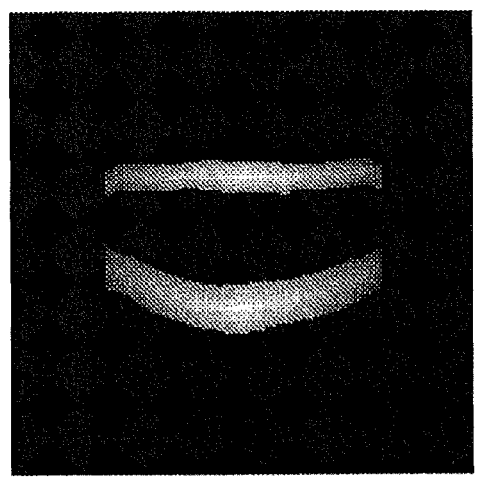
FIG. 19 corresponds to FIG. 16, and is an image depicting the correction weight Wg.

In more detail, the image correction unit 21 sets the correction weight Wg for the upper and lower lips, such that it increases toward the central location of the lip region in the lateral direction and decreases toward each outer side (each mouth end) of the lip region in the lateral direction. In addition, the image correction unit 21 sets the correction weight Wg for the upper and lower lips, such that it increases toward the central location of the lip region in the longitudinal direction and decreases toward each end of the lip region in the longitudinal direction. For example, the correction weight is set to 1 at the central location of the lip region in the lateral and longitudinal directions, and is set to 0 at the central location of the lip region in the lateral direction and at each end of the lip region in the longitudinal direction. In addition, the correction weight is set to 0.5 at each outer end of the lip region in the lateral direction and at the central location in the longitudinal direction, and is set to 0 at each outer end of the lip region in the lateral direction and at each end of the lip region in the longitudinal direction. The correction weight between these intervals may be, for example, linearly changed. FIG. 18 is a view depicting the correction weight Wg at each lateral location. Each vertical axis represents a location in the longitudinal direction, and each lateral axis represents the correction weight Wg at a corresponding location. The left graph corresponds to the central location of the lip region in the lateral distance, and the right graph corresponds to each outer location of the lip region in the lateral distance. The correction weight Wg increases at the center of the width of the lip region in each lateral location. In addition, the correction weight Wg increases at the center in the lateral direction. FIG. 19 corresponds to FIG. 16, and is an image depicting the correction weight Wg. It reveals that the correction weight Wg increases in each light area. In contrast to the lip region of FIG. 16, it can be found from the correction weight Wg of FIG. 19 that the correction weight increases in regions that seems like a lip. It should be noted that the lip region determination unit 20 may perform this process, and determine an image obtained by binarizing the image of FIG. 19, as the lip region.

Figure 20:
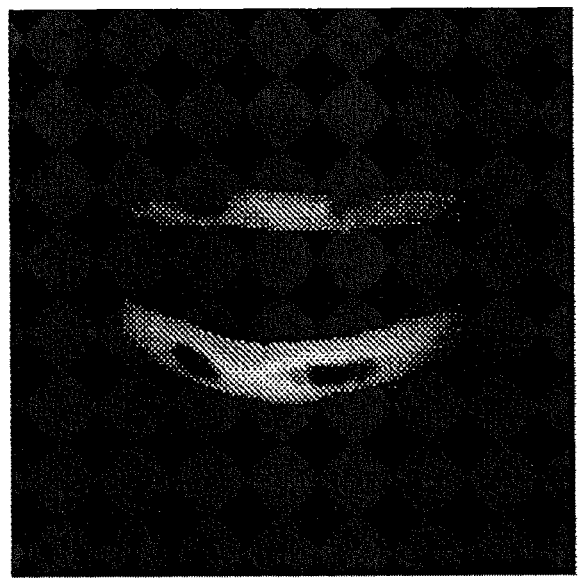
FIG. 20 corresponds to FIG. 19, and is an image depicting a correction portion evaluation value D3.

The image correction unit 21 determines a luster correction region in the lip region to which a luster (brightness) correction is to be subjected, on the basis of the correction weight Wg, the lip candidate region, the first lip color similarity degree We, and the second lip color similarity degree Wf (S22). In more detail, the image correction unit 21 calculates a product of the correction weight Wg (FIG. 19), the lip candidate region (FIG. 16), the first lip color similarity degree We (FIG. 12(b)), and the second lip color similarity degree Wf (FIG. 13(b)) for each pixel, as a correction portion evaluation value D3. FIG. 20 corresponds to FIG. 19, and is an image depicting the correction portion evaluation value D3. It reveals that the correction portion evaluation value D3 increases in each light area. The image correction unit 21 determines a region (pixel) in which a value of the correction portion evaluation value D3 is larger than a predetermined threshold, as the luster correction region that is a target for the luster correction.

In order to perform the luster correction for a natural visual quality, the correction is performed in such a way that brightness is further increased in a partial area (region) which is lightest in the luster correction region. Here, brightness is increased in each of pixels around the pixel having the maximum brightness in the luster correction region. Therefore, a lustrous image is prepared in order to add brightness to some of the pixels in the lip region in the following process.

Figure 21:
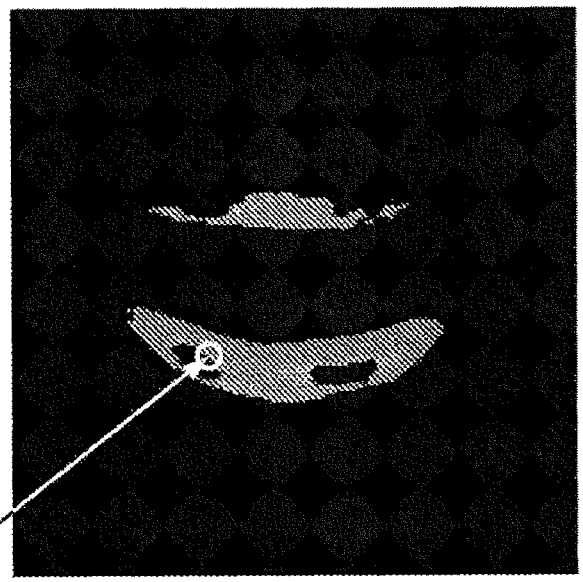
FIG. 21 corresponds to FIG. 2(b), and is an image depicting brightness of each extracted pixel.

The image correction unit 21 extracts only pixels contained in the luster correction region from the smoothed mouth image (S23). FIG. 21 corresponds to FIG. 2(b), and is an image depicting brightness of each extracted pixel. In each light area, the extracted pixels have high brightness, and in the dark area, the extracted pixels have low brightness. It should be noted that locations are darkened, at which the pixels have not been extracted. The image correction unit 21 multiplies a brightness value of each pixel by a concentric weight centered on the pixel having the highest brightness among the extracted pixels. The concentric weight is set to 1 at the center, and is decreased away from the center. In FIG. 21, the pixel having the highest brightness is positioned at the center of a circle illustrated in the figure.

Figure 22:
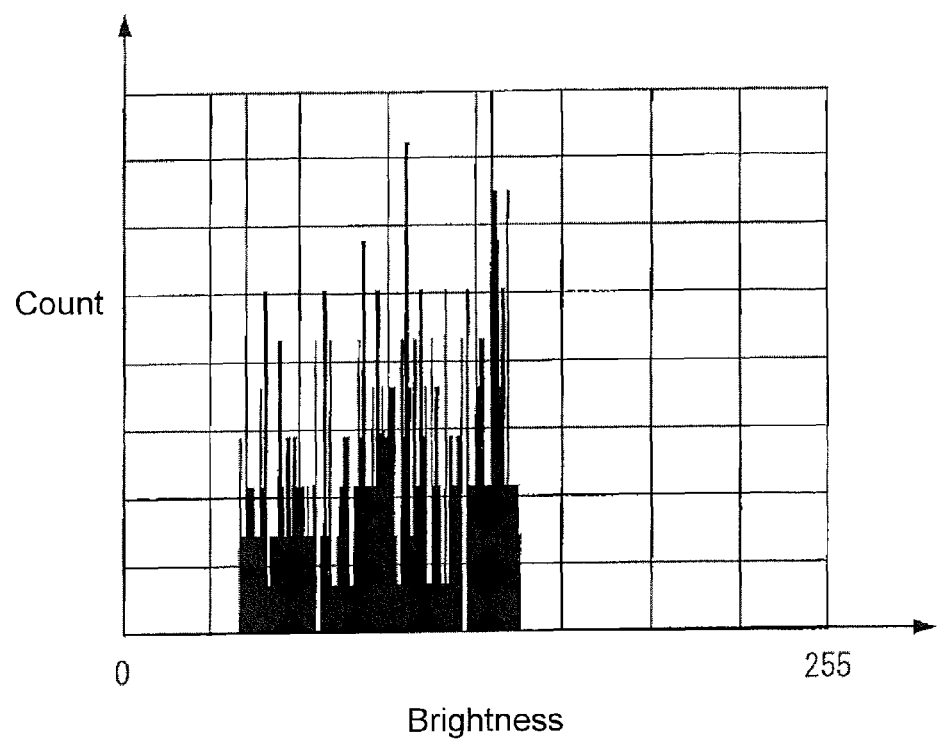
FIG. 22 is a histogram of brightness of each extracted pixel, as a result of weighting the brightness thereof.

FIG. 22 is a histogram of brightness values of extracted pixels, which is the resultant of weighting the brightness values thereof.

Figure 23:
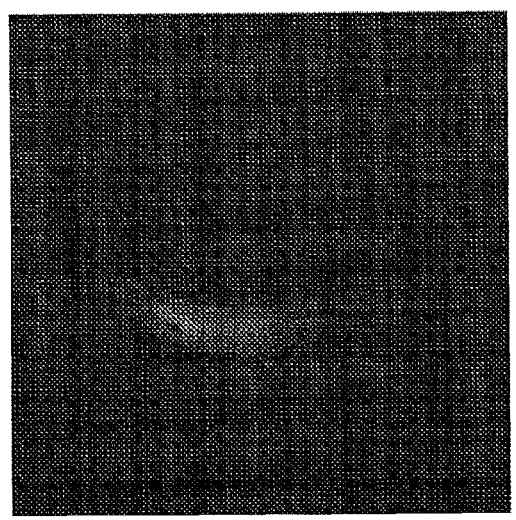
FIG. 23 corresponds to FIG. 21, and is an image depicting a lustrous image having only a brightness component.

The image correction unit 21 generates a lustrous image with high brightness in some of the extracted pixel which account for a predetermined higher ratio of the brightness values that have been multiplied by the weights (S24). FIG. 23 corresponds to FIG. 21, and is an image depicting a lustrous image having only a brightness component. In the image of FIG. 21, the pixel having the highest brightness is determined at the center, and the corresponding lustrous image has high brightness. For example, the image correction unit 21 generates the lustrous image, such that the brightness is increased in some of the extracted pixels which fall within the top 4% of the brightness values multiplied by the weights. In more detail, the image correction unit 21 generates the lustrous image by adjusting a tone curve of the image of FIG. 21, such that the brightness values of pixels falling within the top 4% in the histogram of FIG. 22 are increased after the correction.

FIG. 24(a) is a view depicting a first tone curve for the extracted pixels (FIG. 21), and FIG. 24(b) is a view depicting a second tone curve for the extracted pixels. In each of FIGS. 24(a) and (b), the lateral axis represents input brightness, and the vertical axis represents output brightness of a tone curve. The histogram of FIG. 22 is overlaid on each of the figures, for the sake of reference. Here, each brightness value ranges from 0 to 255. The output brightness of the first tone curve is corrected, such that the highest one of the brightness values of the extracted pixels becomes 128, and the brightness of each of all the pixels excluding the pixels having brightness values falling within the top 4% becomes 0. Then, the output brightness of the first tone curve is corrected, such that the brightness of each of the pixels falling within the top 4% of the brightness values is linearly changed to fall within a range from 0 to 128 in accordance with the brightness values thereof. The output brightness of the second tone curve is linearly changed, such that the maximum input brightness 255 of the brightness values of the extracted pixels is changed into the maximum output brightness 127. An image is generated as a lustrous image (FIG. 23), which is obtained by multiplying a predetermined correction degree (for example, 0.1) by an image (maximum brightness is 255) obtained by adding an image in which the brightness values in the image (extracted pixels) of FIG. 21 is adjusted with the first tone curve and an image in which the brightness values in the image (extracted pixels) of FIG. 21 is adjusted with the second tone curve. Because of the predetermined correction degree, the maximum brightness of the lustrous image becomes, for example, approximately 25. The brightness value of the lustrous image becomes the brightness correction values for the mouth image.

Figure 25:
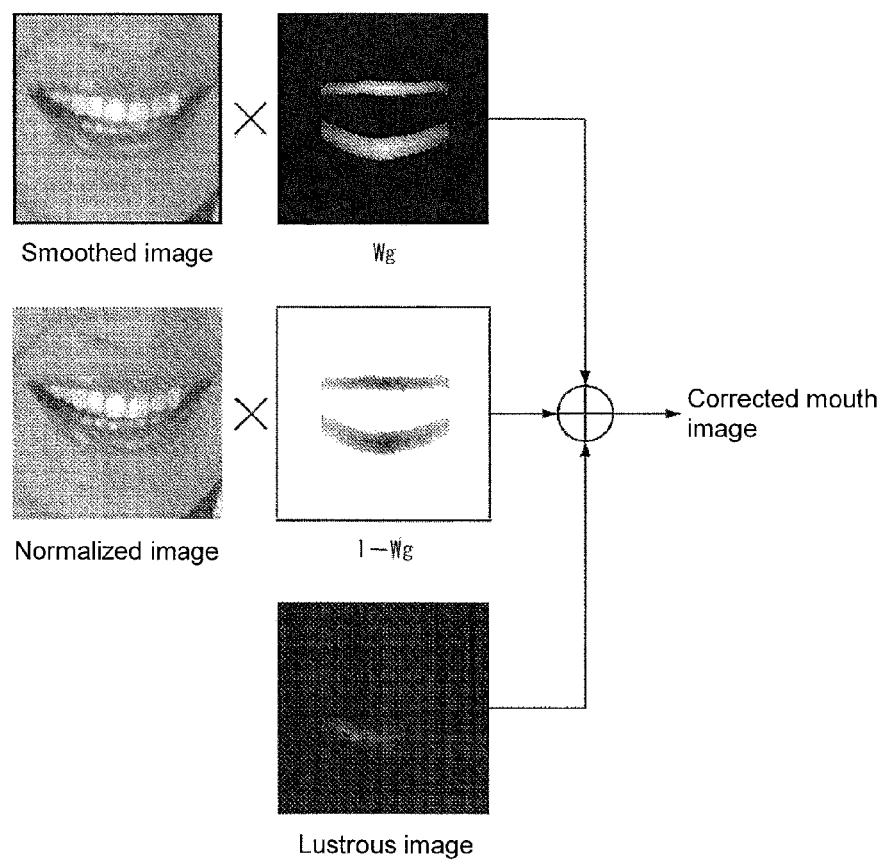
FIG. 25 is a process of combining the normalized mouth image, smoothed mouth image, and lustrous image.

The image correction unit 21 combines the normalized mouth image depicted in FIG. 2(a), the smoothed mouth image depicted in FIG. 2(b), and the lustrous image depicted in FIG. 23 for the brightness value of each pixel, thereby generating a corrected mouth image (S25). In more detail, the image correction unit 21 sets, to brightness values of the corrected mouth image, the sum of values obtained by multiplying the brightness value of each pixel in the smoothed mouth image (FIG. 2(b)) by the correction weight Wg depicted in FIG. 19, values obtained by multiplying the brightness value of each pixel in the normalized mouth image (FIG. 2(a)) by a weight (1−Wg), and the brightness value of each pixel in the lustrous image (FIG. 23). FIG. 25 is an image depicting a process of combining a normalized mouth image, a smoothed mouth image, and a lustrous image. A brightness value Yc of each pixel in the corrected mouth image is determined by the following equation.

[Equation 9]

$$Yc = Wg \times Yf + (1-Wg) \times Yn \quad (9)$$

where Yf denotes a pixel value of a pixel in a smoothed mouth image, Yn denotes a pixel value of a pixel in a normalized mouth image, and Yg denotes a pixel value of a pixel in a lustrous image. Here, the correction weight Wg has a value ranging from 0 to 1. If the brightness value Yc, which is the resultant of the addition, exceeds the maximum brightness 255, the brightness value of the corresponding pixel is set to 255. By combining the smoothed mouth image with the lip region, the variation in the brightness can be smoothed in the lip region. By combining the lustrous image with the lip region, the luster can be increased in the lip region. Here, the image correction unit 21 does not correct the hue and saturation.

The synthesis unit 22 returns the size of the corrected mouth image to the original size thereof before the normalization (by rotating and scaling up or down the corrected mouth image as necessary), and then combines the corrected mouth image with the image to be processed, thereby generating a corrected image (S26). Consequently, an image in which the visual quality of the mouth and the like in the image to be processed has been corrected is obtained.

Figure 26A:
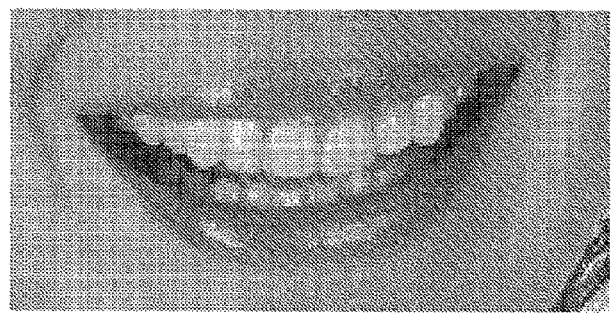
FIG. 26(a) is an image depicting part of a face image before a correction.
Figure 26B:
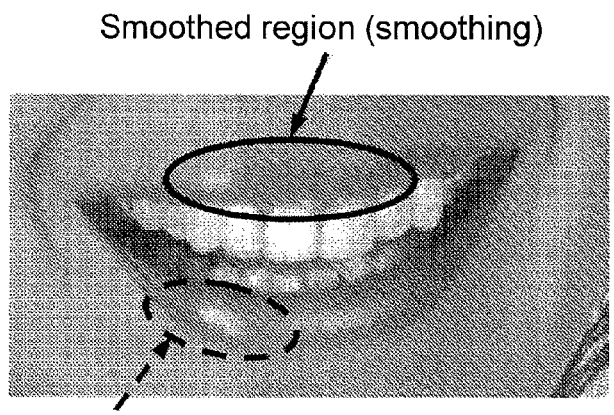
FIG. 26(b) is an image depicting part of the face image after the correction.

FIG. 26(a) is an image depicting a part of a face image before the correction, and FIG. 26(b) is an image depicting a part of the face image after the correction. It can be found that the visual quality of the upper and lower lips is entirely smoothed, and the luster is increased in a part of the lower lip. It should be noted that a correction for a tooth whitening process which will be described is also applied in FIG. 16(b).

The display control unit 23 causes the display device 5 to display the image which has undergone the correction process, and terminates the correction process.

According to the image processing device 6 according to one or more embodiments of the present invention, it is possible to determine a representative color of a lip that may have various colors, on the basis of information regarding hue and saturation of a mouth image including a lip and skin other than brightness, and to determine a lip region precisely on the basis of the determined representative color of the lip. Furthermore, it is possible to subject the lip of the person in the image to a correction process appropriately by subjecting the determined lip region to the correction process.

In the conventional image processing, it is taken for granted that a lip region is detected with information regarding brightness. This attributes to a fact that there is an advantage to detect a lip region on the basis of the brightness. A reason for this is as follows.

First, a method based on brightness is also applicable to grayscale images.

Figure 27A:
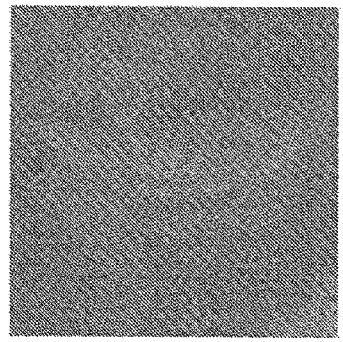
FIG. 27(a) corresponds to FIG. 2(a) and is an image depicting a Cb component value in the normalized mouth image, and FIG. 27(b) corresponds to FIG. 2(a) and is an image depicting a Cr component value in the normalized mouth image.
Figure 27B:
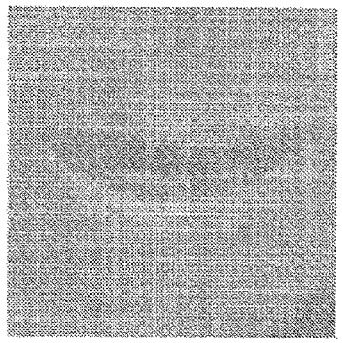

Second, in general, a Y component in a mouth image becomes sharper at an edge than a Cb or Cr component does. Accordingly, using the Y component facilitates detection of an edge of a mouth or the like. FIG. 27(a) corresponds to FIG. 2(a) and is an image depicting a Cb component value in a normalized mouth image, and FIG. 27(b) corresponds to FIG. 2(a) and is an image depicting a Cr component value in a normalized mouth image. It reveals that each component exhibits an increased value in light areas. When FIGS. 27(a) and (b) which depict a CbCr component is compared to FIG. 2(a) depicting brightness Y, the image depicting the brightness Y enables an edge of a lip to be identified more clearly.

Conventionally, as described above, a region and color of a lip can be identified on the basis of the brightness under that excellent lighting condition and the like. Meanwhile, when a region and color of a lip is identified on the basis of the brightness, as in the conventional technique, under the bad lighting condition (that the shade is partially generated or the light is too bright, etc.) and the like, many erroneous detections may occur, so that the region and color of the lip could not be identified precisely.

On the other hand, when a color of a lip is known in advance, a method of determining a lip region on the basis of hue or saturation has been performed in the past. In contrast to a typical method of detecting a color of a skin which is distributed throughout a wide area of a face, in many cases, there is difficulty detecting a color of a lip, namely, a color in a small region in a face by means of the same method.

In contrast, the image processing device 6 according to one or more embodiments of the present invention can determine a representative color of the lip and determine the region of the lip, even when a color of a lip is not known and a region of the lip is also not known. The image processing device 6 determines, as a representative color of a lip, a candidate color that differs (has a great difference) from colors of a skin and teeth, in accordance with a difference in hue and saturation. Therefore, even when a skin and a lip have the same hue in an image due to the shade, lighting, cosmetics, or the like, or even when a color of a skin is greatly varied in an image, depending on the location, the image processing device 6 can distinguish between the lip and each of the skin and teeth precisely, and determine a representative color of the lip. Moreover, the image processing device 6 determines a degree to which each candidate color is a lip color in consideration of the distribution of the skin color and the like, thus being able to determine a lip color degree more appropriately. Here, the difference in hue and saturation refers to a difference between two colors in a hue and saturation plane (CbCr plane), and implies a difference in hue, a difference in saturation, and a distance in the hue and saturation plane.

The image processing device 6 selects a plurality of candidate colors in accordance with a difference in hue and saturation from a skin color, and selects, as a representative color of a lip, one of the candidate colors which seems like a lop color (for example, has a large amount of saturation). Consequently, it is possible to determine the representative color of the lip more precisely.

Furthermore, the image processing device 6 determines, as a lip region, a region that is similar to the representative color of the lip, in accordance with a difference in hue and saturation between the representative color of the lip and each pixel. In the case where an image is captured in a relatively bright lighting environment, a lip may partially become whitish in the image. A luster region of the whitish lip has a small amount of saturation, whereas another region in the lip has a large amount of saturation. As a result, a distance increases between the respective colors of the luster region and the other region in the CbCr plane. However, the hue is not changed in the luster region. Thus, the luster region can also be determined as the lip region precisely by considering the hue. Meanwhile, even when the skin and the lip have the same hue, the lip region can be determined precisely by considering a distance between the representative color of the lip and each pixel in the CbCr plane.

Moreover, the image processing device 6 applies a predetermined lip-shaped model or the like, on the basis of a spatial distribution of pixels (pixels in the lip candidate region) that are similar to the representative color of the lip, and determines pixels constituting a lip-like shape and/or pixels positioned at lip-like locations, as a modeled lip region. In the case where there is a region that is not a lip but is similar to the representative color of the lip, it is necessary to determine only a lip region from lip candidate regions. Therefore, by tailoring (fitting) the lip-shaped model to the lip candidate regions, only a pixel positioned at a lip-like location can be determined from the lip candidate regions, as the lip region. In addition, even if a part of a lip is not similar to the representative color of the lip due to a lighting condition or the like, pixels contained in the lip-shaped model can be identified as a lip region when the lip-shaped model is fitted to the lip candidate region. Consequently, it is possible to determine, as a lip region, even a region of a lip in which information regarding hue and saturation is lost, due to white lighting upon capturing.

According to the image processing device 6 according to one or more embodiments of the present invention, as described above, it is possible to determine a representative color of a lip precisely even in an image that has been captured under a bad condition, and to determine a lip region precisely.

Below, a description will be given regarding a case of performing a tooth whitening correction as the correction process according to one or more embodiments of the present invention. It should be noted that the same reference numerals are given to members and configurations that have the same function as that drawings described above, and a detailed description thereof will be omitted, for the sake of description's convenience. Hereinafter, embodiments of the present invention will be described in detail, with reference to the drawings.

(Configuration of Digital Camera)

Figure 28:
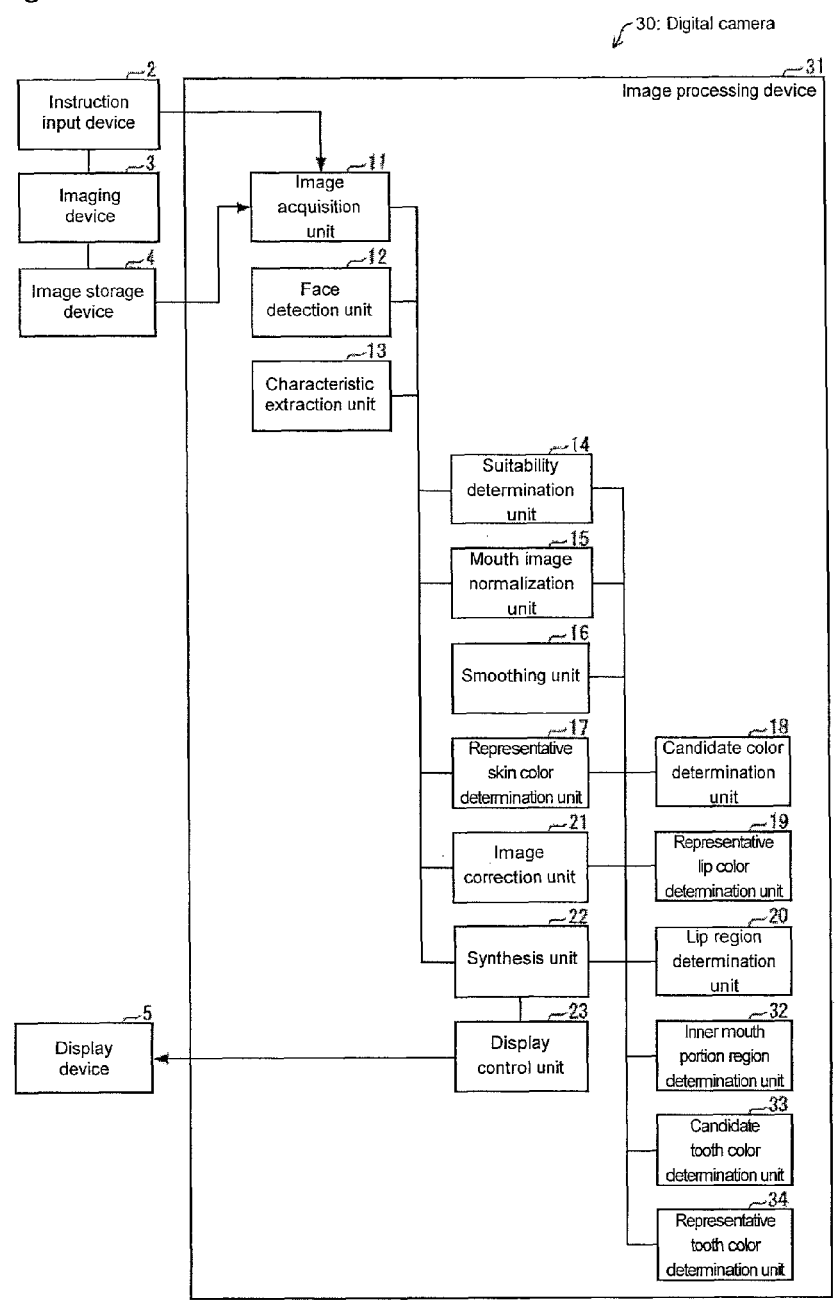
FIG. 28 is a block diagram of a general configuration of a digital camera according to one or more embodiments of the present invention.

FIG. 28 is a block diagram of a general configuration of a digital camera 30 according to one or more embodiments of the present invention. The digital camera 30 includes an instruction input device 2, an imaging device 3, an image storage device 4, a display device 5, and an image processing device 31.

(Configuration of Image Processing Device)

The image processing device 31 includes an inner mouth portion region determination unit 32, a candidate tooth color determination unit 33, and a representative tooth color determination unit 34, in addition to the configuration of the image processing device 6.

The inner mouth portion region determination unit 32 receives information indicating a lip region from the lip region determination unit 20, and determines, as an inner mouth portion region, a region between the upper and lower lip regions that the lip region determination unit 20 has determined. The lip region determination unit 20 determines the respective regions of the upper and lower lips precisely, thereby being able to determine the region of the inner mouth portion which contains the teeth in the mouth image. It should be noted if no space is present between the upper and lower lip regions, the tooth whitening correction is not performed. The inner mouth portion region determination unit 32 outputs information indicating the determined inner mouth portion region to the candidate tooth color determination unit 33.

The candidate tooth color determination unit 33 determines a plurality of candidate tooth colors that become candidates for a color of the teeth, on the basis of information indicating the inner mouth portion region and the smoothed mouth image that has been received from the smoothing unit 16. The candidate tooth color determination unit 33 determines respective representative colors of a plurality of regions contained in the inner mouth portion region of the mouth image, and treats the representative colors as candidate tooth colors. For example, the candidate tooth color determination unit 33 separates the mouth image into a plurality of regions, as depicted in FIG. 3. Then, the candidate tooth color determination unit 33 determines respective representative colors (average colors, colors having a median or mode value, or the like) of the regions contained in the inner mouth portion region, as the plurality of color candidates for a color of the teeth (candidate tooth colors). At least one of the regions separated in this manner is assumed to be a region that mainly contains the teeth. Accordingly, it is expected that a color suitable for the representative color of the tooth color is present in the plurality of candidate tooth colors. However, the method of setting (separating) each region is not limited to the above. There is no limitation on the size of each of the plurality of separated regions, and individual pixels may be treated as a plurality of regions, respectively. It should be noted that the candidate tooth color determination unit 33 determines the candidate tooth colors with the smoothed mouth image, in order to determine the candidate tooth colors after removing noise or the like from the image. However, the method of determining the candidate tooth colors is not limited to this. Alternatively, the candidate tooth color determination unit 33 may determine the candidate tooth colors with the non-smoothed mouth image. In addition, the candidate tooth color determination unit 33 determines distribution degrees of the colors of the separated regions, as distribution degrees of the corresponding candidate tooth colors. The candidate tooth color determination unit 33 outputs the plurality of candidate tooth colors and the distribution degrees of the candidate tooth colors to the representative tooth color determination unit 34. In addition, the candidate tooth color determination unit 33 outputs the distribution degrees of the candidate tooth colors to the image correction unit 21.

The representative tooth color determination unit 34 determines a representative color of the teeth which has a high degree of tooth color, from the plurality of candidate tooth colors. In more detail, the representative tooth color determination unit 34 determines one of the candidate tooth colors which has the smallest amount of saturation, as a representative color of the teeth. The representative tooth color determination unit 34 outputs the representative color of the teeth to the image correction unit 21.

The image correction unit 21 corrects a visual quality of the mouth image, on the basis of the instruction of the correction process, the normalized mouth image, the smoothed mouth image, and the representative colors for the lip and teeth, thereby generating a corrected mouth image. A method of correcting the mouth image will be described later. The image correction unit 21 outputs the corrected mouth image to the synthesis unit 22.

(Image Processing Flow)

Hereinafter, a description will be given of a flow of an image correction flow performed by the digital camera 30. It should be noted that process performed until a lip region is determined (process of FIG. 5) is the same as above.

Figure 29:
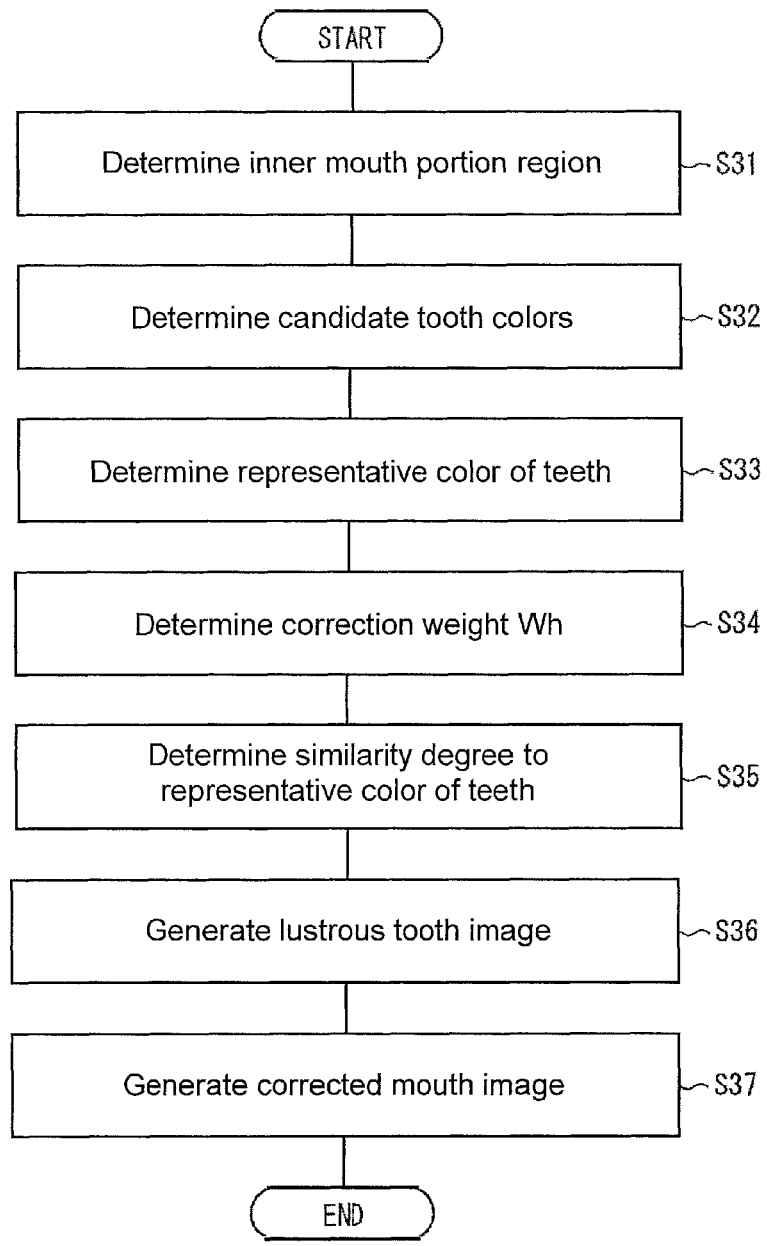
FIG. 29 is a flowchart of a flow of an inner mouth region determination process and a correction process.

FIG. 29 is a flowchart of a flow of an inner mouth region location process and a correction process (tooth whitening process) that the image processing device 31 performs. The image processing device 31 corrects teeth in an image so as to shine whitely by increasing the brightness of a region of the teeth.

First, the inner mouth portion region determination unit 32 determines, as an inner mouth portion region, a region between upper and lower lip regions that the lip region determination unit 20 has determined (S31). In more detail, the inner mouth portion region determination unit 32 determines the region sandwiched by the upper and lower lip regions of FIG. 16, as the inner mouth portion region. The region of the teeth is assumed to be contained in the inner mouth portion region of the mouth image.

The candidate tooth color determination unit 33 separates at least one part of the inner mouth portion region in the mouth image into a plurality of regions, and determines respective representative colors of the separated regions, as a plurality of candidate colors for the tooth color (candidate tooth colors) (S32). In this case, an average color of each region is set to the candidate color for each region.

The representative tooth color determination unit 34 compares respective saturations of the candidate tooth colors, and determines one of the candidate tooth colors which has the smallest amount of saturation, as a representative color of the teeth (S33).

The image correction unit 21 determines a weight (correction weight Wh) for performing an image correction for teeth at the pixel locations in the inner mouth portion region (S34). For example, it can be assumed that in many cases, a region in the inner mouth portion region which is determined close to each mouth end is hidden by the mouth. For this reason, it is only necessary to intensively apply the correction process of whitening teeth to a portion that is determined in the vicinity of a central portion of the inner mouth portion region in the lateral direction. In this way, the image correction for a natural visual quality is performed.

Figure 30:
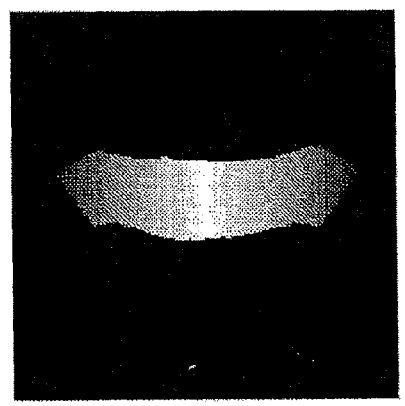
FIG. 30 corresponds to FIG. 16, and is an image depicting an inner mouth portion region and a correction weight Wh thereof.

In more detail, the image correction unit 21 sets the correction weight Wh, such that it increases toward the central location of the inner mouth portion region in the lateral direction and decreases toward each outer side (each mouth end) of the lip region in the lateral direction. For example, the correction weight may be set to 1 at the central location of the inner mouth portion region in the lateral direction, and set to 0 at each outer end of the inner mouth portion region in the lateral direction. The correction weight between these intervals may be, for example, linearly changed. FIG. 30 corresponds to FIG. 16, and is an image depicting the inner mouth portion region and the correction weight Wh thereof. It reveals that the correction weight Wg increases in each light area.

The image correction unit 21 determines a similarity degree of each pixel in the inner mouth portion region to the representative color of the teeth (S35). In more detail, the image correction unit 21 determines a tooth color similarity degree Wi according to a distance between a color of each pixel and the representative color of the teeth in a color space.

The tooth color similarity degree Wi according to the distance in the color space can be determined by the following equation.

Figure 31:
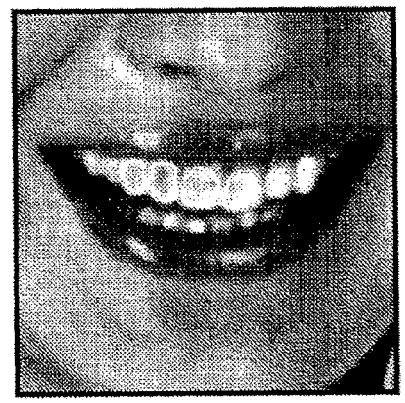
FIG. 31 corresponds to FIG. 2(b), and is an image depicting a result of calculating a tooth color similarity degree Wi of each pixel in the mouth image.

[Equation 10]
$$Wi = \exp\left\{-\frac{(Yt-Y)^2 + (Cbt-Cb)^2 + (Crt-Cr)^2}{\sigma yt^2 + \sigma bt^2 + \sigma rt^2}\right\} \quad (10)$$

where Yt, Cbt and Crt denote brightness Y, Cb and Cr components, respectively, in a representative color of teeth, and Y, Cb and Cr denote Y, Cb and Cr components, respectively, in a color of each pixel. σyt, σbt and σrt are standard deviations of colors of teeth on Y, Cb and Ce axes, respectively, in a color space. The standard deviation of a color of teeth can be determined from a color of each pixel in a region (one of the regions separated by the candidate tooth color determination unit 33) corresponding to a representative color of the teeth (a candidate tooth color finally determined as the representative color of the teeth). It should be noted that a dark pixel has small amounts of hue and saturation, similar to a whitish pixel in a tooth region. Therefore, brightness Y is considered in determining the tooth color similarity degree Wi, and the tooth color similarity degree Wi decreases in a dark pixel. FIG. 31 corresponds to FIG. 2(b), and is an image depicting a result of calculating the tooth color similarity degree Wi by applying a color of each pixel in a mouth image to equation (10). It reveals that the tooth color similarity degree Wi increases in each light area, and decreases in each dark area. It can be found from this that the tooth color similarity degree Wi increases in the tooth region. The tooth color similarity degree Wi decreases in regions in the inner mouth portion region other than the teeth, such as gum, a deep portion in the mouth, and a tongue.

In order to perform the tooth luster correction for a natural visual quality, a lustrous tooth image which is to be used to add brightness to the pixels in the tooth region is prepared in the following process.

The image correction unit 21 generates the lustrous tooth image for the inner mouth portion region, on the basis of the correction weight Wh, the tooth color similarity degree Wi, the first lip color similarity degree We, and the second lip color similarity degree Wf for the inner mouth portion region (S36). In more detail, a product of the correction weight Wh and tooth color similarity degree Wi for each pixel in the inner mouth portion region is multiplied by (1−We) and (1−Wf) for a corresponding pixel and a predetermined correction degree (for example, 20). As a result, a generated image is treated as the lustrous tooth image.

Figure 32:
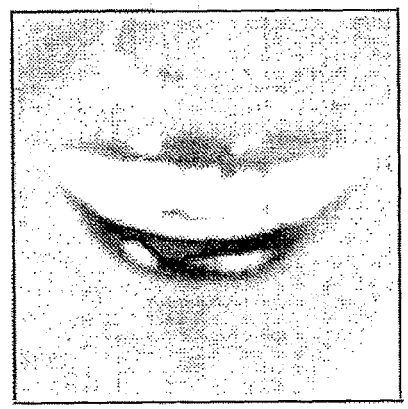
FIG. 32 corresponds to FIG. 12(b), and is an image depicting a value (1-We) of each pixel.
Figure 33:
FIG. 33 corresponds to FIG. 13(b), and is an image depicting a value (1-Wf) of each pixel.
Figure 34:
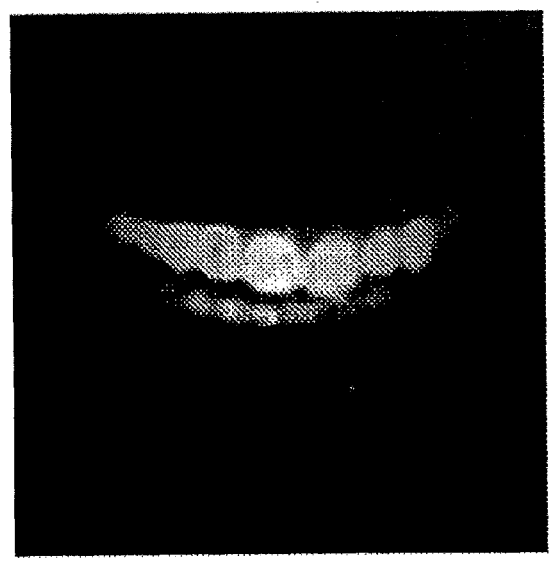
FIG. 34 corresponds to FIG. 31, and is an image depicting a lustrous tooth image.

FIG. 32 corresponds to FIG. 12(b), and is an image depicting a value (1−We) of each pixel. FIG. 33 corresponds to FIG. 13(b), and is an image depicting a value (1−Wf) of each pixel. FIG. 34 corresponds to FIG. 31, and is an image depicting the lustrous tooth image. It reveals that a value increases in each light area. It should be noted that each of the correction weight Wh, tooth color similarity degree Wi, first lip color similarity degree We, and second lip color similarity degree Wf for the inner mouth portion region has a value ranging from 0 to 1. For example, when the correction degree is 20, each pixel in the lustrous tooth image has a value ranging from 0 to 20. A value of each pixel in the lustrous tooth image becomes a correction value for brightness which is used to correct the mouth image. By obtaining a product of the correction weight Wh and tooth color similarity degree Wi for the inner mouth portion region, a correction weight for a central portion of the inner mouth portion region in the lateral direction which would be teeth can be increased.

In the case where a mouth is opened but teeth are not seen in an image, a color of a tongue or the like may be determined as a representative color of the teeth. It is assumed that a color of a tongue is relatively similar to that of a lip. In such a case, (1−We) and (1−Wf) are considered so as not to correct the color of the tongue to become lighter. This can prevent a region having hue and saturation similar to those of a lip (for example, tongue) from being corrected.

The image correction unit 21 combines a brightness value of each pixel in the normalized mouth image depicted in FIG. 2(a) and a brightness value of a corresponding pixel in the lustrous tooth image depicted in FIG. 34, thereby generating a corrected mouth image (S37). In more detail, the image correction unit 21 sets an addition of a brightness value of each pixel in the normalized mouth image (FIG. 2(a)) and a brightness value of a corresponding pixel in the lustrous tooth image (FIG. 34) to a brightness value of each pixel in the corrected mouth image. If the brightness value, which is the resultant of the addition, exceeds the maximum brightness 255, the brightness value of the corresponding pixel is set to 255.

The synthesis unit 22 combines the corrected mouth image with the image to be processed (face image). The subsequent processing is the same as above.

When FIGS. 26(a) and (b) are compared, it can be found that brightness increases within the region of the teeth, in particular, within the central region thereof in the lateral direction in the image partially depicting a corrected face image of FIG. 26(b).

The image processing device 31 according to one or more embodiments of the present invention can determine an inner mouth portion region precisely, on the basis of a lip region. Furthermore, the image processing device 31 can subject teeth of a person in an image to a correction process appropriately, by applying the correction process to a region of the inner mouth portion region which would be teeth to a high degree.

In the lustrous image of FIG. 34, light areas represent an area that would be teeth to a high degree. Therefore, it is said that the lustrous tooth image represents a tooth region. According to one or more embodiments of the present invention, as described above, a region of teeth can be determined precisely.

An image processing device according to one or more embodiments of the present invention identifies a characteristic of a lip from a face image including a mouth of a person. This image processing device includes: a representative skin color determination unit that determines a representative color of a skin in the face image; a candidate color determination unit that sets a plurality of regions in the face image such that at least one of the regions contains a part of the lip and that determines representative colors of the regions as candidate colors; and a representative lip color determination unit that determines a representative color of the lip from the plurality of candidate colors in accordance with a difference in hue and saturation between the representative color of the skin and each candidate color.

An image processing method according to one or more embodiments of the present invention identifies a characteristic of a lip from a face image including a mouth of a person. This image processing method includes: a representative skin color determination step of determining a representative color of a skin in the face image; a candidate color determination step of setting a plurality of regions in the face image such that at least one of the regions contains a part of the lip, and determining representative colors for the regions as candidate colors; and representative lip color determination step of determining a representative color of the lip from the plurality of representative colors in accordance with a difference in hue and saturation between the representative color of the skin and each candidate color.

According to the above configuration, the representative color of the lip is determined from the candidate colors, on the basis of the difference in hue and saturation within the face image including the lip and skin. Consequently, it is possible to precisely determine a representative color of a lip that may have various colors, so as to be distinguished from a color of a skin. Here, the difference in the hue and saturation refers to a difference between two colors in a hue and saturation plane, and implies a difference in hue, a difference in saturation, and a distance in the hue and saturation plane.

The above representative lip color determination unit may determine the representative color of the lip, in accordance with a difference in hue and saturation, other than brightness or lightness, between the representative color of the skin and each candidate color.

In the case where a region and color of a lip is identified on the basis of the brightness, as in the conventional technique, under a bad lighting condition (that the shade is partially generated around the lip or the light is too bright, etc.) and the like, many erroneous detections may occur, so that the region and color of the lip could not be identified precisely.

According to the above configuration, the representative color of the above lip is determined in accordance with a difference in hue and saturation, without using information regarding brightness or lightness. Therefore, even when a skin and a lip have the same hue in an image due to the shade, lighting, cosmetics, or the like, or even when a color of a skin is greatly varied in an image, depending on the location, the representative lip color determination unit can distinguish between the lip and each of the skin and teeth precisely, and determine the representative color of the lip precisely.

The above representative lip color determination unit may determine the representative color of the above lip, in accordance with a distance between each candidate color and the representative color of the skin in a hue and saturation plane of a color space, a difference in hue between each candidate color and the representative color of the skin, and an amount of saturation of each candidate color.

Furthermore, the above representative lip color determination unit may be configured to: determine a first weight for each candidate color according to a distance between each candidate color and a representative color of the above skin in a hue and saturation plane of a color space, a second weight for each candidate color according to a difference in hue between each candidate color and the representative color of the skin, and a third weight for each candidate color according to an amount of saturation of each candidate color; determine a lip color degree based on the first, second and third weights; and determine one of the candidate colors which has the high lip color degree, as the representative color of the lip. The first weight may increase as the distance increases between the candidate color and the representative color of the above skin in the hue and saturation plane of the color space. The second weight may increase as the difference in hue increases between the candidate color and the representative color of the above skin. The third weight may increase as the amount of the saturation of the candidate color increases. The lip color degree may increase according to the first, second and third weights.

According to the above configuration, a skin and a lip can be distinguished from each other, on the basis of the distance between each candidate color and the representative color of the skin in the hue and saturation plane, and the difference in hue between each candidate color and the representative color of the above skin. In addition, teeth and a lip can be distinguished from each other, on the basis of the amount of the saturation of each candidate color. Consequently, it is possible to distinguish between a lip and a skin or teeth, thereby determining the representative color of the lip precisely.

Moreover, the above representative lip color determination unit may be configured to: determine a first weight for each candidate color according to a distance between each candidate color and a representative color of the above skin in a hue and saturation plane of a color space, a second weight for each candidate color according to a difference in hue between each candidate color and the representative color of the above skin, and a third weight for each candidate color according to an amount of saturation of each candidate color; determine a lip color degree based on the first, second and third weights; and selects one of the candidate colors which has the high lip color degree, as a first selection representative color. The first weight may increase as the distance increases between the candidate color and the representative color of the above skin in the hue and saturation plane of the color space. The second weight may increase as the difference in hue increases between the candidate color and the representative color of the above skin. The third weight may increase as the amount of the saturation of the candidate color increases. The lip color degree may increase according to the first, second and third weights. The above representative lip color determination unit may be configured to: determine a fourth weight for each candidate color other than the first selection representative color according to a distance between each candidate color and the first selection representative color in the hue and saturation plane of the color space; determine a candidate evaluation value based on the lip color degree and the fourth weight; and select at least one of the candidate colors other than the first selection representative color which has the large candidate evaluation value as a second selection representative color. The fourth weight may increase as the distance increases between the candidate color and the first selection representative color in the hue and saturation plane of the color space, and the candidate evaluation value may increase according to the lip color degree and the fourth weight. The representative lip color determination unit may be configured to determine, as the representative color of the lip, one of the respective candidate colors selected as the first and second selection representative colors which have the largest amount of saturation or whose hue is the closest to a predetermined hue.

The above configuration selects, as the first selection representative color, one of the candidate colors which has a great difference from a skin color, on the basis of the distance between each candidate color and the representative color of the above skin in the hue and saturation plane, the difference in hue between each candidate color and the representative color of the above skin, and the amount of the saturation of each candidate color. In addition, the above configuration selects, as the second selection representative color, one of the candidate colors other than the first selection representative color which has a great difference from the first selection representative color, in accordance with the distance between each candidate color and the first selection representative color in the hue and saturation plane. Then, the configuration determines, as the representative color of the lip, one of the respective candidate colors selected as the first and second selection representative colors which have the largest amount of saturation or whose hue is the closest to the predetermined hue.

Thus, a plurality of candidate colors are selected in accordance with a difference in hue and saturation from a skin color, and one of the candidate colors which seems like a lip color (for example, has a large amount of saturation or its saturation is close to red) is selected as the representative color of the lip. Therefore, even if respective colors of a skin and lip are similar to each other, the above configuration can prevent a color of teeth from being erroneously determined as the representative color of the lip, and determine the representative color of the lip more precisely by distinguishing between the lip and the skin or teeth.

The above image processing device may be configured to include the lip region determination unit that determines a region having a color similar to the representative color of the lip, as a first lip region, in accordance with the difference in hue and saturation from the representative color of the lip.

In the case where an image is captured under a condition of the relatively bright lighting environment, a part of a lip may become whitish in the image. Since a light region is partially present in the lip, a region determination with brightness may cause erroneous detection.

The above configuration can determine even a partially light region to be a lip region precisely in consideration of hue. Meanwhile, even when the skin and the lip have the same hue, the above configuration can determine a lip region precisely in consideration of a distance between a representative color of the lip and a color of each region (for example, each pixel) in a hue and saturation plane. Consequently, it is possible to determine the lip region precisely, on the basis of the determined representative color of the lip.

The above lip region determination unit may determine, as the first lip region, a region having a color whose distance to the representative color of the lip is equal to or shorter than a first threshold in the hue and saturation plane of the color space and/or whose difference in hue from the representative color of the lip is equal to or smaller than a second threshold.

The above lip region determination unit may tailor a predetermined lip-shaped model that defines a shape of a lip to the first lip region, and determine a region specified by the tailored lip-shaped model, as a second lip region.

The first lip region, which is a region similar to a representative color of a lip, may contain pixels (noise) in a skin or mouth that are similar to the representative color of the lip but are not the lip.

The above configuration tailors a shape and/or location of the lip-shaped model that defines a shape of a lip-like lip to the first lip region, on the basis of the first lip region which is a region similar to a representative color of a lip. The region specified by the tailored lip-shaped model becomes a lip-like cluster of pixels, from which the above noise pixels are removed. Therefore, only pixels positioned at lip-like locations can be determined as the (second) lip region. Even a region of a lip in which information regarding hue and saturation is lost, due to white lighting upon capturing, can also be determined precisely, as a lip region.

The above lip region determination unit may determine longitudinal central points of upper and lower lips at a plurality of lateral locations, on the basis of the above first lip region, and determine a region of a predetermined longitudinal width which is centered on each central point as the second lip region.

The above configuration can determine the longitudinal central points of the upper and lower lips, and determine a more lip-like region as the second lip region, on the basis of each central point.

(Program and Recording Medium)

The above image processing device may be partially implemented using a computer. In this case, by operating a computer as the above units, a control program that implements the image processing device with the computer, and a computer readable recording medium that stores the control program are also included in the scope of the present invention.

Each block in the image processing devices 6 and 31, in particular, each of the image acquisition unit 11, face detection unit 12, characteristic extraction unit 13, suitability determination unit 14, mouth image normalization unit 15, smoothing unit 16, representative skin color determination unit 17, candidate color determination unit 18, representative lip color determination unit 19, lip region determination unit 20, image correction unit 21, synthesis unit 22, display control unit 23, inner mouth portion region determination unit 32, candidate tooth color determination unit 33, and representative tooth color determination unit 34 may be configured of hardware logic or implemented using software and a CPU (central processing unit) as will be described below.

Specifically, each of the image processing devices 6 and 31 includes: a CPU that executes an instruction from a control program implementing each function; a ROM (read only memory) that stores the program: a RAM (random access memory) that expands the program; and a storage device (recording medium), such as a memory, that stores the program and various types of data. Further, a recording medium that stores, in a computer readable manner, a program code (execute form, intermediate code or source program) of a control program for the image processing device 6 or 31 which is software implementing the above function is supplied to the image processing device 6 or 31, and the computer (a CPU or MPU (microprocessor unit)) reads and executes the program code stored in the recording medium.

For the above recording medium, for example, a tape system such as magnetic tape or cassette tape, a disk system including: a magnetic disk such as a Floppy Disk™/hard disk; and an optical disc such as a CD-ROM (compact disc read-only memory)/MO (magneto-optical)/MD (mini disc)/DVD (digital versatile disk)/CD-R (CD Recordable), a card system such as an IC card (including a memory card)/an optical card, or a semiconductor memory system such as a mask ROM/EPROM (erasable programmable read-only memory)/EEPROM (electrically erasable and programmable read-only memory)/flash ROM may be used.

The image processing device 6 or 31 may be configured to be connectable to a communication network, and the above program code may be supplied through the communication network. There is no specific limitation on this communication network. For example, the Internet, an intranet, an extranet, LAN (local area network), an ISDN (integrated services digital network), a VAN (value-added network), a CATV (community antenna television) communication network, a virtual private network, a telephone line network, a mobile communication network, a satellite communication network, or the like is available. There is no specific limitation on a transmission medium constituting a communication network. For example, either a wired medium, including a IEEE (institute of electrical and electronic engineers) 1394, a USB, power line transfer, a cable television line, a telephone line, and an ADSL (asynchronous digital subscriber loop) line, or a wireless medium, including infrared such as IrDA (infra red data association) or remote control, Bluetooth™, 802.11 communication, an HDR (high data rate), a cellular phone network, a satellite connection, or a digital terrestrial network is available.

The present invention is not limited to the embodiments described above, and various modifications thereof can be made without departing from the scope described in the claims. Embodiments obtained by combining the technical means disclosed in the different embodiments as appropriate is also included in the technical scope of the present invention.

One or more embodiments of the present invention can be employed in digital cameras equipped with an image processing device and the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1, 30 digital camera
2 instruction input device
3 imaging device
4 image storage device
5 display device
6, 31 image processing device
11 image acquisition unit (instruction receiving unit)
12 face detection unit
13 characteristic extraction unit
14 suitability determination unit
15 mouth image normalization unit
16 smoothing unit
17 representative skin color determination unit
18 candidate color determination unit
19 representative lip color determination unit
20 lip region determination unit
21 image correction unit
22 synthesis unit
23 display control unit
32 inner mouth portion region determination unit
33 candidate tooth color determination unit
34 representative tooth color determination unit

The invention claimed is:

1. An image processing device that identifies a characteristic of a lip from a face image including a mouth of a person, the image processing device comprising:
a representative skin color determination unit that determines a representative color of a skin in the face image;
a candidate color determination unit that sets a plurality of regions in the face image such that at least one of the regions contains a part of the lip, and determines representative colors of the regions as candidate colors; and
a representative lip color determination unit that determines a representative color of the lip from the plurality of candidate colors, in accordance with a difference in hue and saturation between the representative color of the skin and each candidate color.

2. The image processing device according to claim 1, wherein the representative lip color determination unit determines the representative color of the lip, in accordance with a difference in hue and saturation, other than brightness or lightness, between the representative color of the skin and each candidate color.

3. The image processing device according to claim 1, wherein the representative lip color determination unit determines the representative color of the lip, in accordance with a distance between each candidate color and the representative color of the skin in a hue and saturation plane of a color space, the difference in hue between each candidate color and the representative color of the skin, and an amount of saturation of each candidate color.

4. The image processing device according to claim 1,
wherein the representative lip color determination unit determines first, second and third weights for each candidate color,
wherein the first weight is according to the distance between each candidate color and the representative color of the skin in the hue and saturation plane of the color space,
wherein the second weight is according to the difference in hue between each candidate color and the representative color of the skin,
wherein the third weight is according to the amount of the saturation of each candidate color,
wherein the representative lip color determination unit determines a lip color degree based on the first, second and third weights, and determines one of the candidate colors which has the high lip color degree, as a representative color of the lip,
wherein the first weight increases as the distance increases between each candidate color and the representative color of the skin in the hue and saturation plane of the color space,
wherein the second weight increases as the difference in hue increases between each candidate color and the representative color of the skin,
wherein the third weight increases as the amount of the saturation of each candidate color increases, and
wherein the lip color degree increases according to the first, second and third weights.

5. The image processing device according to claim 1,
wherein the representative lip color determination unit determines first, second and third weights for each candidate color,
wherein the first weight is according to a distance between each candidate color and the representative color of the skin in a hue and saturation plane of a color space,
wherein a second weight is according to the difference in hue between each candidate color and the representative color of the skin,
wherein a third weight is according to an amount of saturation of each candidate color,
wherein the representative lip color determination unit determines a lip color degree based on the first, second and third weights, and selects one of the candidate colors which has the high lip color degree, as a first selection representative color, wherein the first weight increases as the distance increases between each candidate color and the representative color of the skin in the hue and saturation plane of the color space, wherein the second weight increases as the difference in hue increases between each candidate color and the representative color of the skin, wherein the third weight increases as the amount of the saturation of the candidate color increases, wherein the lip color degree increases according to the first, second and third weights, wherein the representative lip color determination unit determines a fourth weight for each candidate color other than the first selection representative color, wherein the fourth weight is according to a distance between each candidate color other than the first selection representative color and the first selection representative color in the hue and saturation plane of the color space, wherein the representative lip color determination unit determines a candidate evaluation value based on the lip color degree and the fourth weight, and selects at least one of the candidate colors other than the first selection representative color which has the large candidate evaluation value as a second selection representative color, wherein the fourth weight increases as the distance increases between each candidate color and the first selection representative color in the hue and saturation plane of the color space, wherein the candidate evaluation value increases according to the lip color degree and the fourth weight, and wherein the representative lip color determination unit determines, as the representative color of the lip, one of the respective candidate colors selected as the first and second selection representative colors which have the largest amount of saturation or whose hue is the closest to a predetermined hue.

6. The image processing device according to claim 1, further comprising a lip region determination unit that determines a region having a color similar to the representative color of the lip, as a first lip region, in accordance with the difference in hue and saturation from the representative color of the lip.

7. The image processing device according to claim 6, wherein the lip region determination unit determines, as the first lip region, a region having a color whose distance to the representative color of the lip is equal to or shorter than a first threshold in the hue and saturation plane of the color space or whose difference in hue from the representative color of the lip is equal to or smaller than a second threshold.

8. The image processing device according to claim 6, wherein the lip region determination unit tailors a predetermined lip-shaped model that defines a shape of a lip to the first lip region, and determines a region specified by the tailored lip-shaped model, as a second lip region.

9. The image processing device according to claim 6, wherein the lip region determination unit determines longitudinal central points of upper and lower lips at a plurality of lateral locations, on the basis of the first lip region, and determine a region of a predetermined longitudinal width which is centered on each central point as the second lip region.

10. An image processing method of identifying a characteristic of a lip from a face image including a mouth of a person, the image processing method comprising:

a representative skin color determination step of determining via an image processing device a representative color of a skin in the face image;

a candidate color determination step of setting via the image processing device a plurality of regions in the face image such that at least one of the regions contains a part of the lip, and determining representative colors of the regions as candidate colors; and a representative lip color determination step of determining via the image processing device a representative color of the lip from the plurality of representative colors, in accordance with a difference in hue and saturation between the representative color of the skin and each candidate color.

11. A control program stored on a non-transitory computer readable medium for an image processing device that identifies a characteristic of a lip from a face image including a mouth of a person, the control program causing a computer to executing:

a representative skin color determination step of determining a representative color of a skin in the face image;

a candidate color determination step of setting a plurality of regions in the face image such that at least one of the regions contains a part of the lip, and determining representative colors of the regions as candidate colors; and a representative lip color determination step of determining a representative color of the lip from the plurality of representative colors, in accordance with a difference in hue and saturation between the representative color of the skin and each candidate color.

12. The image processing device according to claim 2, wherein the representative lip color determination unit determines the representative color of the lip, in accordance with a distance between each candidate color and the representative color of the skin in a hue and saturation plane of a color space, the difference in hue between each candidate color and the representative color of the skin, and an amount of saturation of each candidate color.

13. The image processing device according to claim 2, wherein the representative lip color determination unit determines first, second and third weights for each candidate color, wherein the first weight is according to the distance between each candidate color and the representative color of the skin in the hue and saturation plane of the color space, wherein the second weight is according to the difference in hue between each candidate color and the representative color of the skin, wherein the third weight is according to the amount of the saturation of each candidate color, wherein the representative lip color determination unit determines a lip color degree based on the first, second and third weights, and determines one of the candidate colors which has the high lip color degree, as a representative color of the lip, wherein the first weight increases as the distance increases between each candidate color and the representative color of the skin in the hue and saturation plane of the color space, wherein the second weight increases as the difference in hue increases between each candidate color and the representative color of the skin, wherein the third weight increases as the amount of the saturation of each candidate color increases, and wherein the lip color degree increases according to the first, second and third weights.

14. The image processing device according to claim 3,
wherein the representative lip color determination unit determines first, second and third weights for each candidate color,
wherein the first weight is according to the distance between each candidate color and the representative color of the skin in the hue and saturation plane of the color space,
wherein the second weight is according to the difference in hue between each candidate color and the representative color of the skin,
wherein the third weight is according to the amount of the saturation of each candidate color,
wherein the representative lip color determination unit determines a lip color degree based on the first, second and third weights, and determines one of the candidate colors which has the high lip color degree, as a representative color of the lip,
wherein the first weight increases as the distance increases between each candidate color and the representative color of the skin in the hue and saturation plane of the color space,
wherein the second weight increases as the difference in hue increases between each candidate color and the representative color of the skin,
wherein the third weight increases as the amount of the saturation of each candidate color increases, and
wherein the lip color degree increases according to the first, second and third weights.

15. The image processing device according to claim 12,
wherein the representative lip color determination unit determines first, second and third weights for each candidate color,
wherein the first weight is according to the distance between each candidate color and the representative color of the skin in the hue and saturation plane of the color space,
wherein the second weight is according to the difference in hue between each candidate color and the representative color of the skin,
wherein the third weight is according to the amount of the saturation of each candidate color,
wherein the representative lip color determination unit determines a lip color degree based on the first, second and third weights, and determines one of the candidate colors which has the high lip color degree, as a representative color of the lip,
wherein the first weight increases as the distance increases between each candidate color and the representative color of the skin in the hue and saturation plane of the color space,
wherein the second weight increases as the difference in hue increases between each candidate color and the representative color of the skin,
wherein the third weight increases as the amount of the saturation of each candidate color increases, and
wherein the lip color degree increases according to the first, second and third weights.

16. The image processing device according to claim 2,
wherein the representative lip color determination unit determines first, second and third weights for each candidate color,
wherein the first weight is according to a distance between each candidate color and the representative color of the skin in a hue and saturation plane of a color space,
wherein a second weight is according to the difference in hue between each candidate color and the representative color of the skin,
wherein a third weight is according to an amount of saturation of each candidate color,
wherein the representative lip color determination unit determines a lip color degree based on the first, second and third weights, and selects one of the candidate colors which has the high lip color degree, as a first selection representative color,
wherein the first weight increases as the distance increases between each candidate color and the representative color of the skin in the hue and saturation plane of the color space,
wherein the second weight increases as the difference in hue increases between each candidate color and the representative color of the skin,
wherein the third weight increases as the amount of the saturation of the candidate color increases,
wherein the lip color degree increases according to the first, second and third weights,
wherein the representative lip color determination unit determines a fourth weight for each candidate color other than the first selection representative color,
wherein the fourth weight is according to a distance between each candidate color other than the first selection representative color and the first selection representative color in the hue and saturation plane of the color space,
wherein the representative lip color determination unit determines a candidate evaluation value based on the lip color degree and the fourth weight, and selects at least one of the candidate colors other than the first selection representative color which has the large candidate evaluation value as a second selection representative color,
wherein the fourth weight increases as the distance increases between each candidate color and the first selection representative color in the hue and saturation plane of the color space,
wherein the candidate evaluation value increases according to the lip color degree and the fourth weight, and
wherein the representative lip color determination unit determines, as the representative color of the lip, one of the respective candidate colors selected as the first and second selection representative colors which have the largest amount of saturation or whose hue is the closest to a predetermined hue.

17. The image processing device according to claim 2, further comprising a lip region determination unit that determines a region having a color similar to the representative color of the lip, as a first lip region, in accordance with the difference in hue and saturation from the representative color of the lip.

18. The image processing device according to claim 3, further comprising a lip region determination unit that determines a region having a color similar to the representative color of the lip, as a first lip region, in accordance with the difference in hue and saturation from the representative color of the lip.

19. The image processing device according to claim 4, further comprising a lip region determination unit that determines a region having a color similar to the representative color of the lip, as a first lip region, in accordance with the difference in hue and saturation from the representative color of the lip.

20. The image processing device according to claim 5, further comprising a lip region determination unit that determines a region having a color similar to the representative color of the lip, as a first lip region, in accordance with the difference in hue and saturation from the representative color of the lip.

* * * * *